US012582055B2

(12) United States Patent
Pogatchnik, III et al.

(10) Patent No.: US 12,582,055 B2
(45) Date of Patent: Mar. 24, 2026

(54) TURF ROLLER

(71) Applicant: The Toro Company, Bloomington, MN (US)

(72) Inventors: Joseph W. Pogatchnik, III, Waconia, MN (US); Alan J. Kummet, Champlin, MN (US)

(73) Assignee: The Toro Company, Bloomington, MN (US)

( * ) Notice: Subject to any disclaimer, the term of this patent is extended or adjusted under 35 U.S.C. 154(b) by 0 days.

(21) Appl. No.: 18/745,879

(22) Filed: Jun. 17, 2024

(65) Prior Publication Data

US 2024/0334888 A1 Oct. 10, 2024

Related U.S. Application Data

(63) Continuation of application No. 18/370,568, filed on Sep. 20, 2023.

(60) Provisional application No. 63/510,272, filed on Jun. 26, 2023, provisional application No. 63/411,887, filed on Sep. 30, 2022, provisional application No. 63/376,401, filed on Sep. 20, 2022.

(51) Int. Cl.
| | |
|---|---|
| *A01G 20/35* | (2018.01) |
| *A01B 29/02* | (2006.01) |
| *A01B 73/00* | (2006.01) |

(52) U.S. Cl.
CPC .............. *A01G 20/35* (2018.02); *A01B 29/02* (2013.01); *A01B 73/00* (2013.01)

(58) Field of Classification Search
CPC ....... A01B 73/005; A01B 29/02; A01B 45/02; A01B 73/00; A01G 20/35; A01G 20/30; A01G 20/40; A01D 34/032; A01D 34/065; A01D 67/005; A01D 59/00; A01D 75/30; A01D 34/00; A01D 34/001
USPC ........................................................ 404/122
See application file for complete search history.

(56) References Cited

U.S. PATENT DOCUMENTS

| | | | |
|---|---|---|---|
| 4,168,750 A * | 9/1979 | Combs ................... | A01B 29/02 172/519 |
| 4,813,841 A * | 3/1989 | Eischen .................... | B60P 1/24 414/485 |

(Continued)

FOREIGN PATENT DOCUMENTS

WO WO-2017136889 A1 * 8/2017 ............. A01B 29/00

OTHER PUBLICATIONS

Electric Roller Model HP3E, https://www.salsco.com/products/golf-course-maintenance/electric-roller-model-hp3e.html, Salsco Inc., 2 pages (Feb. 10, 2022).

(Continued)

*Primary Examiner* — Christopher J Sebesta
*Assistant Examiner* — Blake E Scoville
(74) *Attorney, Agent, or Firm* — Merchant & Gould P.C.

(57) ABSTRACT

A turf roller can include a chassis, a roller assembly supporting the chassis, the roller assembly including a roller, a first actuator operably connected to the roller and configured to control an angular position of the roller, a second actuator operably connected to the roller and configured to rotationally drive the roller, and an operator station supported by the chassis, the operator station including a single input member controlling the output to both the first and second actuators to provide directional and speed control for the drive the turf roller.

28 Claims, 30 Drawing Sheets

(56) References Cited

U.S. PATENT DOCUMENTS

| | | | | |
|---|---|---|---|---|
| 5,337,833 | A | 8/1994 | Rizzo | |
| 5,468,267 | A * | 11/1995 | Dufty | A01G 20/35 |
| | | | | 47/1.01 R |
| 6,457,903 | B1 * | 10/2002 | Dufty | A01B 45/00 |
| | | | | 47/1.01 R |
| 6,840,543 | B2 * | 1/2005 | Dufty | B62D 63/061 |
| | | | | 280/789 |
| 7,100,703 | B2 * | 9/2006 | Etter | A01B 63/22 |
| | | | | 404/85 |
| 7,438,516 | B2 | 10/2008 | Dufty | |
| 7,556,466 | B2 | 7/2009 | Dufty | |
| 7,610,975 | B1 | 11/2009 | Gust et al. | |
| 7,934,886 | B2 | 5/2011 | Dufty | |
| 7,997,826 | B2 | 8/2011 | Dufty | |
| 8,333,249 | B1 * | 12/2012 | Minton | A01B 29/02 |
| | | | | 172/170 |
| 8,499,849 | B2 | 8/2013 | Dufty | |
| 9,084,391 | B2 | 7/2015 | Shida et al. | |
| 9,918,421 | B2 | 3/2018 | Dufty | |
| 9,986,672 | B2 * | 6/2018 | Smyth | A01B 29/06 |
| 10,362,737 | B2 | 7/2019 | Dufty | |
| 10,842,064 | B2 | 11/2020 | Dufty | |
| 11,785,885 | B2 | 10/2023 | Meemken et al. | |
| 2019/0045701 | A1 * | 2/2019 | Dryden | A01G 20/35 |
| 2019/0047341 | A1 | 2/2019 | Dufty | |
| 2024/0334888 | A1 | 10/2024 | Pogatchnik, III | |

OTHER PUBLICATIONS

Electric Roller Model HP3E Specifications, Salsco Inc., 2 pages (Jan. 31, 2022).

Model HP11-III Gas Roller, Salsco, Inc., 4 pages (Aug. 13, 2022).

Tournament XL 7000, https://www.smithco.com/product/tournament-xl-7000-ultra-wide-greensroller, Smithco, 7 pages (publicly known as of the earliest filing date).

Tru-Turf, "Owners Manual, RE50 Golf Greens Roller", 65 pages (publicly known as of Mar. 20, 2023).

Screen captures from YouTube video clip entitled "Tru-Turf BH40 Green Roller", 4 pages, uploaded on Feb. 16, 2021 by user "DoubleATrading." Retrieved from Internet: https://www.youtube.com/watch?v=r9f4-_3mXMQ&t=2s on Jun. 17, 2024.

Great Britain Combined Search and Examination Report for GB Patent Application No. 2409108.4 dated Feb. 19, 2025, 8 pages.

* cited by examiner

TURF ROLLER

CROSS-REFERENCE TO RELATED APPLICATIONS

This application is a continuation of U.S. application Ser. No. 18/370,568, filed Sep. 20, 2023. U.S. application Ser. No. 18/370,568 claims the benefit of U.S. Provisional Application Nos. 63/376,401, filed Sep. 20, 2022; 63/411,887, filed Sep. 30, 2022; and 63/510,272, filed Jun. 26, 2023, the disclosures of which are hereby incorporated herein by reference.

BACKGROUND

A turf roller is a type of ride-on machine used primarily for rolling greens, tennis courts, and other fine turf surfaces on well-maintained lawns in parks, golf courses, sports fields, and on commercial grounds. Turf rollers typically have one or more rollers that contact and compress the turf surface in order to provide a desired surface. This type of rolling can also improve the health of the turf. In typical examples, an operator controls the speed and forward/reverse function of the turf roller through the use of one or more foot pedals while controlling steering through a mechanical input device such as a lever or steering wheel. Improvements are desired.

SUMMARY

A turf roller can include a chassis, a roller assembly supporting the chassis, the roller assembly including a roller, a first actuator operably connected to the roller and configured to control an angular position of the roller, a second actuator operably connected to the roller and configured to rotationally drive the roller, and an operator station supported by the chassis, the operator station including a single input member controlling the output to both the first and second actuators to provide directional and speed control to drive the turf roller.

In some examples, the first actuator is a powered linear actuator and the second actuator is a powered rotary actuator.

In some examples, one or both of the first and second actuators is an electrically powered actuator.

In some examples, a battery for powering one or both of the first and second actuators is included.

In some examples, an electronic controller is included and is for receiving inputs from the single input member and sending outputs to one or both of the first and second actuators.

In some examples, a second roller assembly is provided including a plurality of rollers.

In some examples, the plurality of rollers of the second roller assembly includes a second roller driven by a third actuator and a third roller driven by a fourth actuator.

In some examples, the plurality of rollers of the second roller assembly are non-powered.

In some examples, the first actuator is a mechanical linkage and the second actuator is a powered actuator.

In some examples, a position sensor is provided for detecting a steering position of the single input member and for providing an output to the first actuator via an electronic controller.

An electrically powered turf roller can include a chassis, a battery station including a battery supported by the chassis, a roller assembly supporting the chassis, the roller assembly including a roller, a first electric actuator, powered by the battery, operably connected to the roller and configured to control an angular position of the roller, a second electric actuator, powered by the battery, operably connected to the roller and configured to rotationally drive the roller, an operator station supported by the chassis, the operator station including a single input member, and an electronic controller configured to send output commands to both the first and second electric actuators based on an input signal based on the position of the single electric input member to provide directional and speed control to drive the turf roller.

In some examples, the first actuator is a linear actuator and the second actuator is a rotary actuator.

In some examples, the roller assembly includes a plurality of rollers.

In some examples, a second roller assembly is provided including a plurality of rollers.

In some examples, the plurality of rollers of the second roller assembly includes a second roller driven by a third actuator and a third roller driven by a fourth actuator.

In some examples, the plurality of rollers of the second roller assembly are non-powered.

A turf roller can include a chassis, a roller assembly supporting the chassis, the roller assembly including a roller, a lever arm providing directional and speed control to the turf roller, a mechanical linkage operably coupling the lever arm to the roller assembly such that a position of the lever arm controls a rotational position of the roller assembly to steer the turf roller, a position sensor positioned and arranged to detect an angular position of the lever arm, an actuator operably connected to the roller and configured to drive the roller, and an electronic controller configured to send an output command to the actuator based on an input signal from the position sensor to provide speed control for driving the turf roller.

In some examples, the actuator is a powered rotary actuator.

In some examples, a battery for powering the actuator is provided.

In some examples, a second roller assembly is provided including a plurality of rollers, wherein the plurality of rollers of the second roller assembly includes a second roller driven by a second actuator and a third roller driven by a third actuator.

A turf roller, can include a chassis, one or more roller assemblies operably coupled to the chassis, one or more wheels operably coupled to the chassis and configured to transition between a ground engaging position and a non-ground engaging position, and a towbar selectively couplable to the chassis, wherein at least one of the towbar or the chassis includes a latch grip configured to inhibit separation of the towbar from the chassis when the one or more wheels are in the non-ground engaging position.

In some examples, a rotatable frame operably couple the one or more wheels to the chassis.

In some examples, a towing hitch defined by the chassis is mechanically linked to the rotatable frame to cause the towbar to pivot relative to the chassis when the one or more wheels transition between the ground engaging position and the non-ground engaging position.

In some examples, the turf roller further includes a user control configured to transition the latch grip between a latched position and an unlatched position.

In some examples, in the latched position a portion of the latch grip opposes a locking surface defined by the chassis to inhibit transition of the latch grip to the unlatched position.

In some examples, the one or more roller assemblies comprises at least one first roller assembly and at least one second roller assembly.

In some examples, a rotational axis of the at least one first roller assembly is positioned at least one of forward or aft of a rotational axis of the at least one second roller assembly along a longitudinal axis of the turf roller.

In some examples, the at least one first roller assembly includes a pair of rollers operably coupled to a yoke.

In some examples, the at least one first roller assembly is pivotable relative to the chassis to affect steering of the turf roller.

In some examples, the at least one second roller assembly is pivotably coupled to the chassis, the at least one second roller assembly mechanically linked to the at least one first roller assembly, wherein pivoting of the at least one first roller assembly relative to the chassis causes the at least one second roller assembly to pivot relative to the chassis.

In some examples, each of the at least one first roller assembly and the at least one second roller assembly are independently driven by respective motors.

In some examples, the turf roller further includes a controller configured inhibit rotation of the at least one first roller assembly while rotating the at least one second roller assembly to clear debris from the at least one second roller assembly.

In some examples, the one or more roller assemblies are operably coupled to the chassis via a roller mount defining one or more orifices shaped in size to enable debris to pass therethrough.

A method of clearing debris from a turf roller, can include inhibiting rotation of at least one first roller via a first electric motor, and rotating at least one second roller via a second electric motor while maintaining contact between the second roller and the surface of the ground.

In some examples, the at least one second roller is mounted to a chassis of the turf roller via a roller mount.

In some examples, the method can further include ejecting debris from one or more orifices defined by the roller mount.

A turf roller, can include a chassis, at least one first roller assembly operably coupled to the chassis, the at least one first roller assembly pivotable relative to the chassis to affect steering of the turf roller, and at least one second roller assembly pivotably coupled to the chassis, the at least one second roller assembly mechanically linked to the first roller assembly, wherein pivoting of the first roller assembly relative to the chassis causes the second roller assembly to pivot relative to the chassis.

In some examples, a rotational axis of the at least one first roller assembly is positioned at least one of forward or aft of a rotational axis of the at least one second roller assembly along a longitudinal axis of the turf roller.

In some examples, the at least one first roller assembly includes a pair of rollers operably coupled to a yoke.

In some examples, each of the at least one first roller assembly and the at least one second roller assembly are independently driven by respective motors.

4

Figure 1:
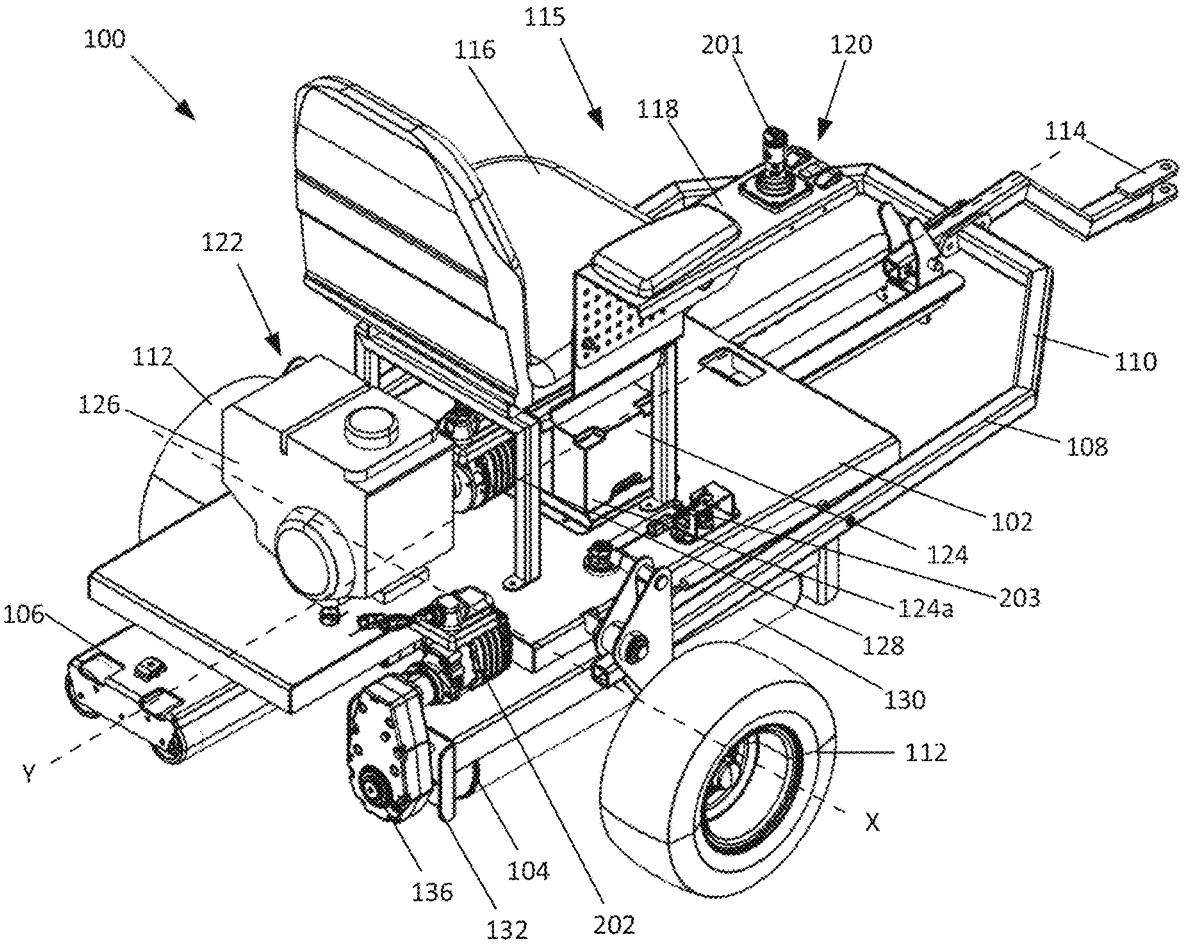
FIG. 1 is a rear top perspective view of a first example of a turf roller having features in accordance with the present disclosure, with a transport carriage rotated into a towing position.
Figure 3:
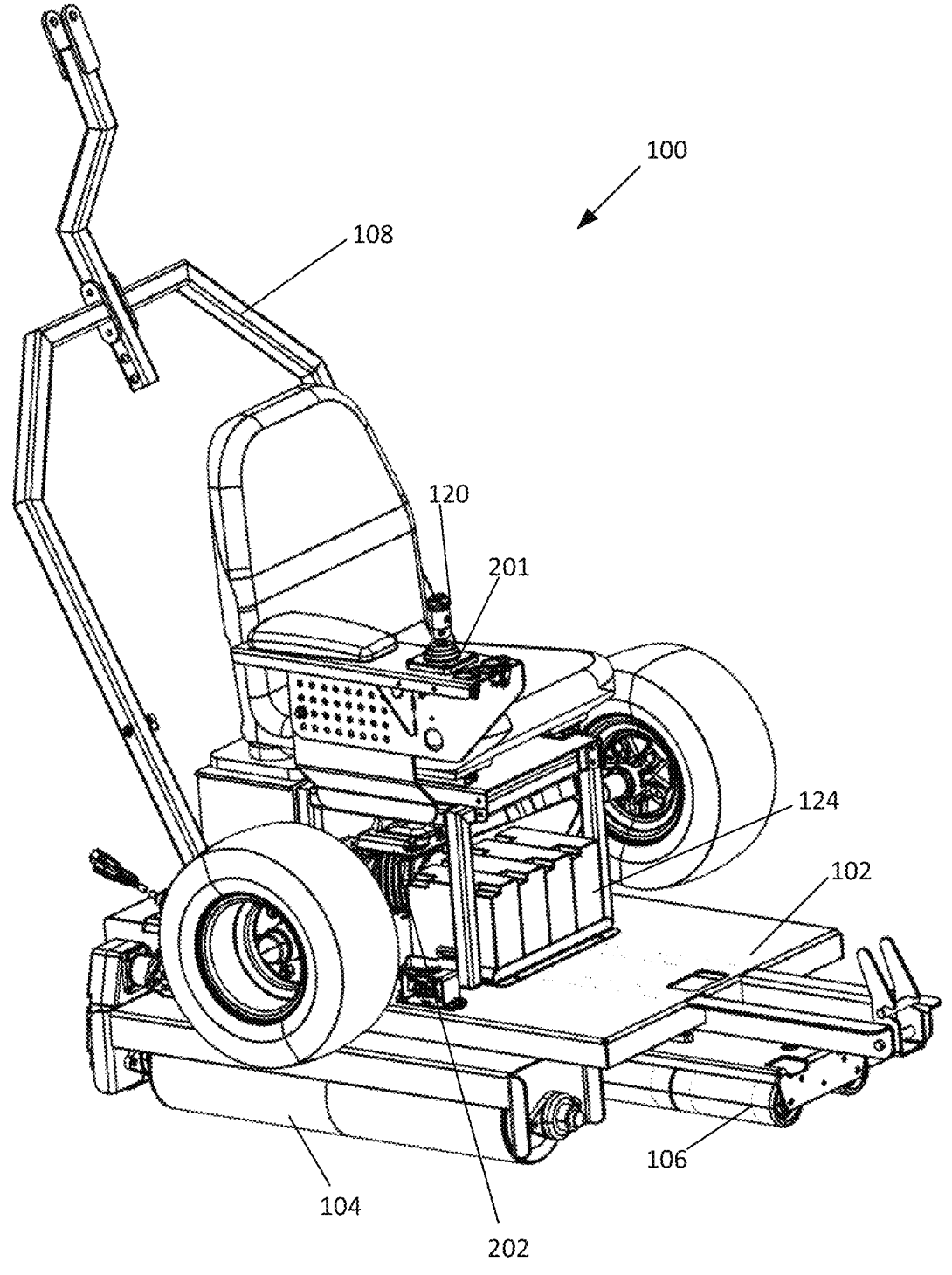

FIG. 3 is a front top perspective view of the turf roller shown in FIG. 1, with the transport carriage rotated into a stored position such that turf roller is in an operating position.

Figure 4:
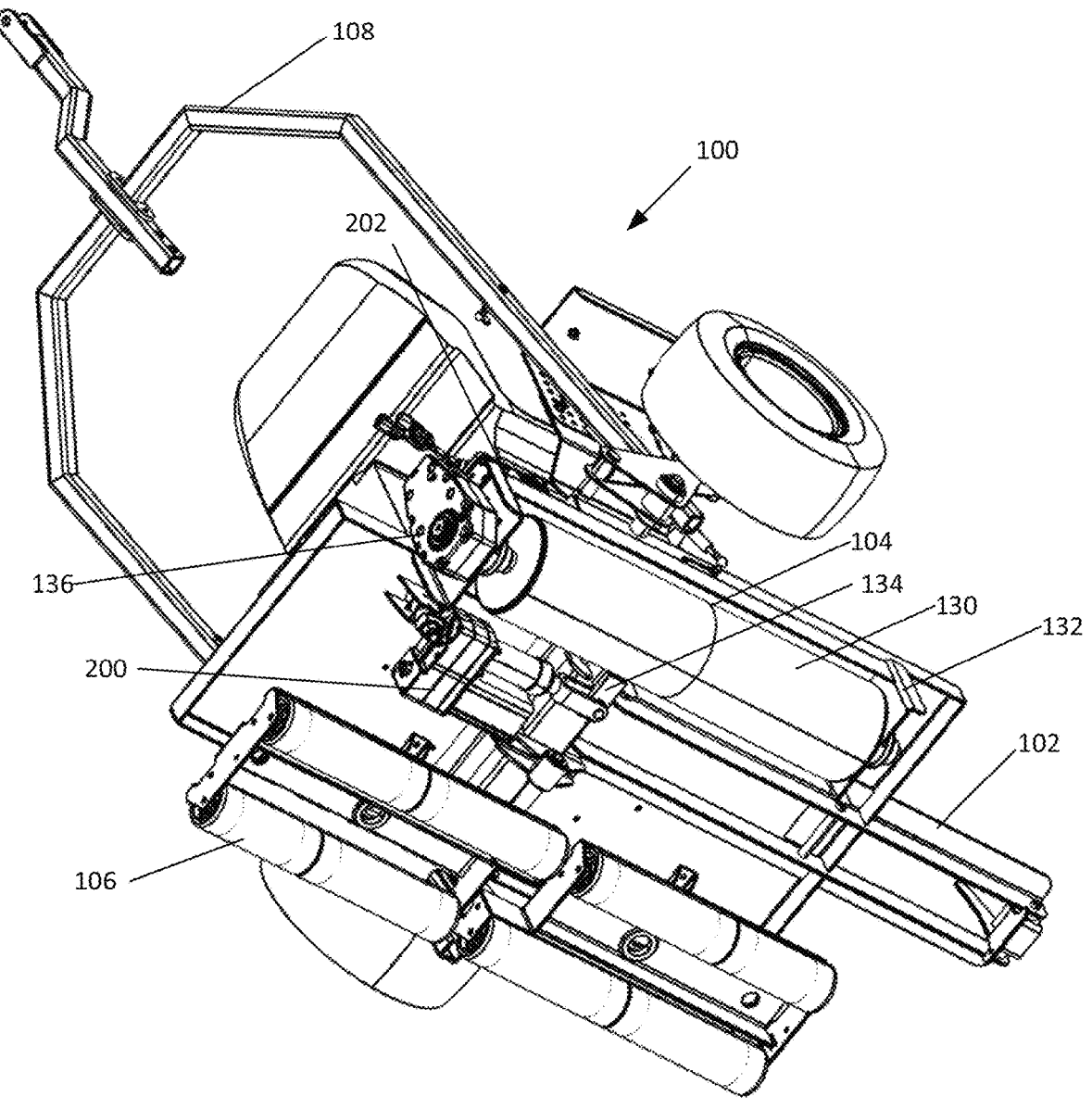

FIG. 4 is a bottom perspective view of the turf roller shown in FIG. 1 and in the configuration shown in FIG. 3.

Figure 5:
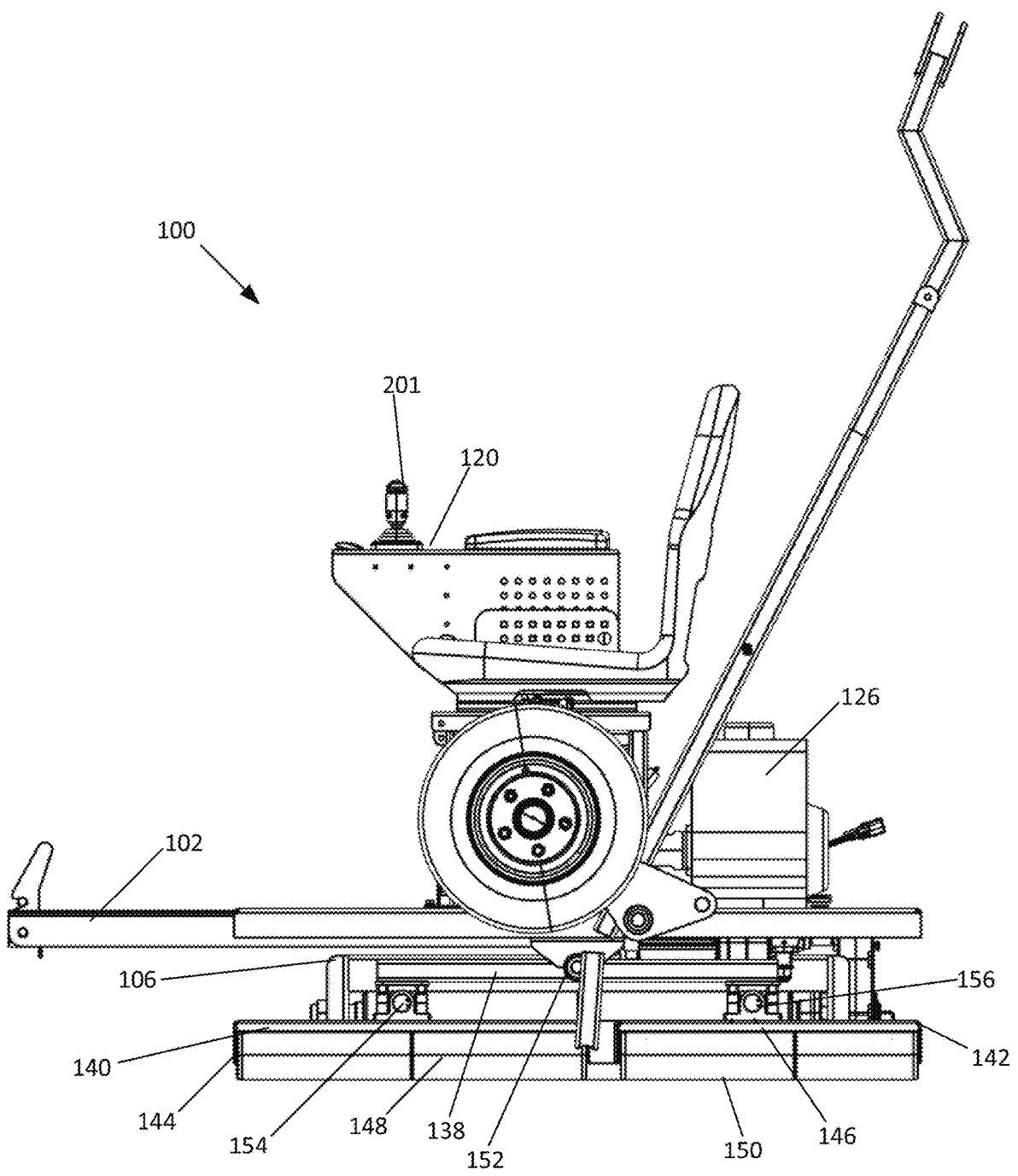

FIG. 5 is a first side view of the turf roller shown in FIG. 1 and in the configuration shown in FIG. 3.

Figure 6:
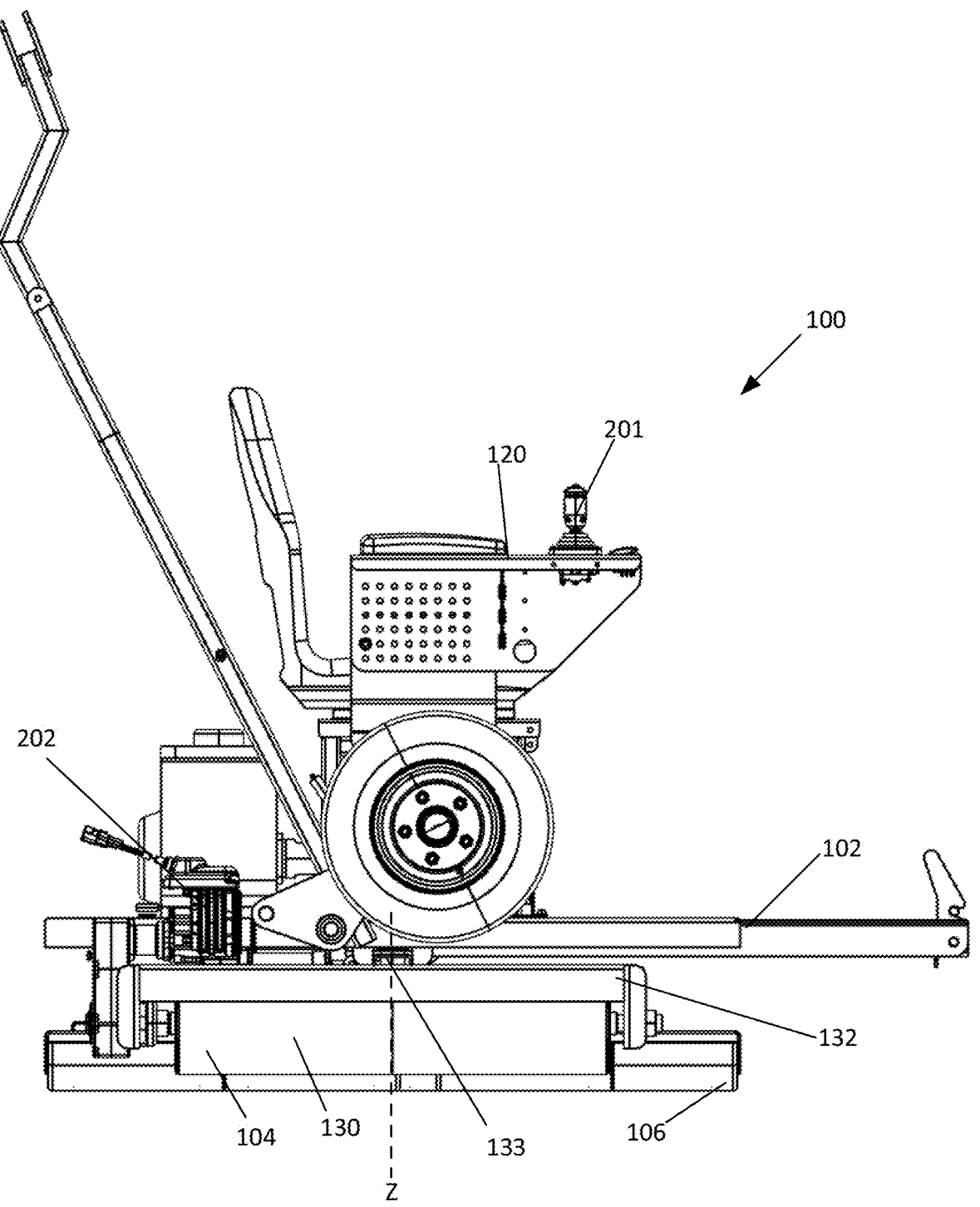

FIG. 6 is a second side view of the turf roller shown in FIG. 1 and in the configuration shown in FIG. 3.

Figure 7:
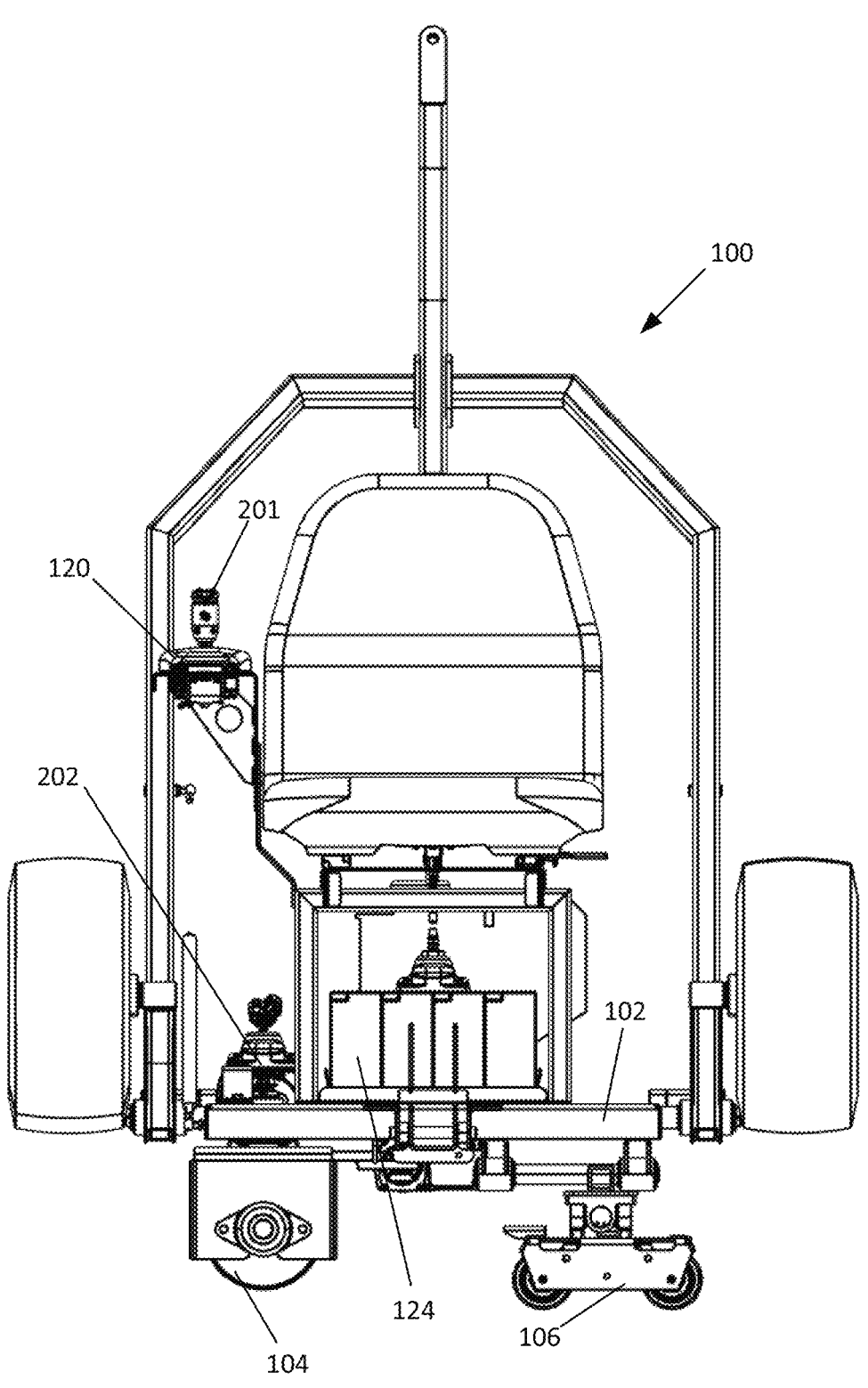

FIG. 7 is a front view of the turf roller shown in FIG. 1 and in the configuration shown in FIG. 3.

Figure 8:
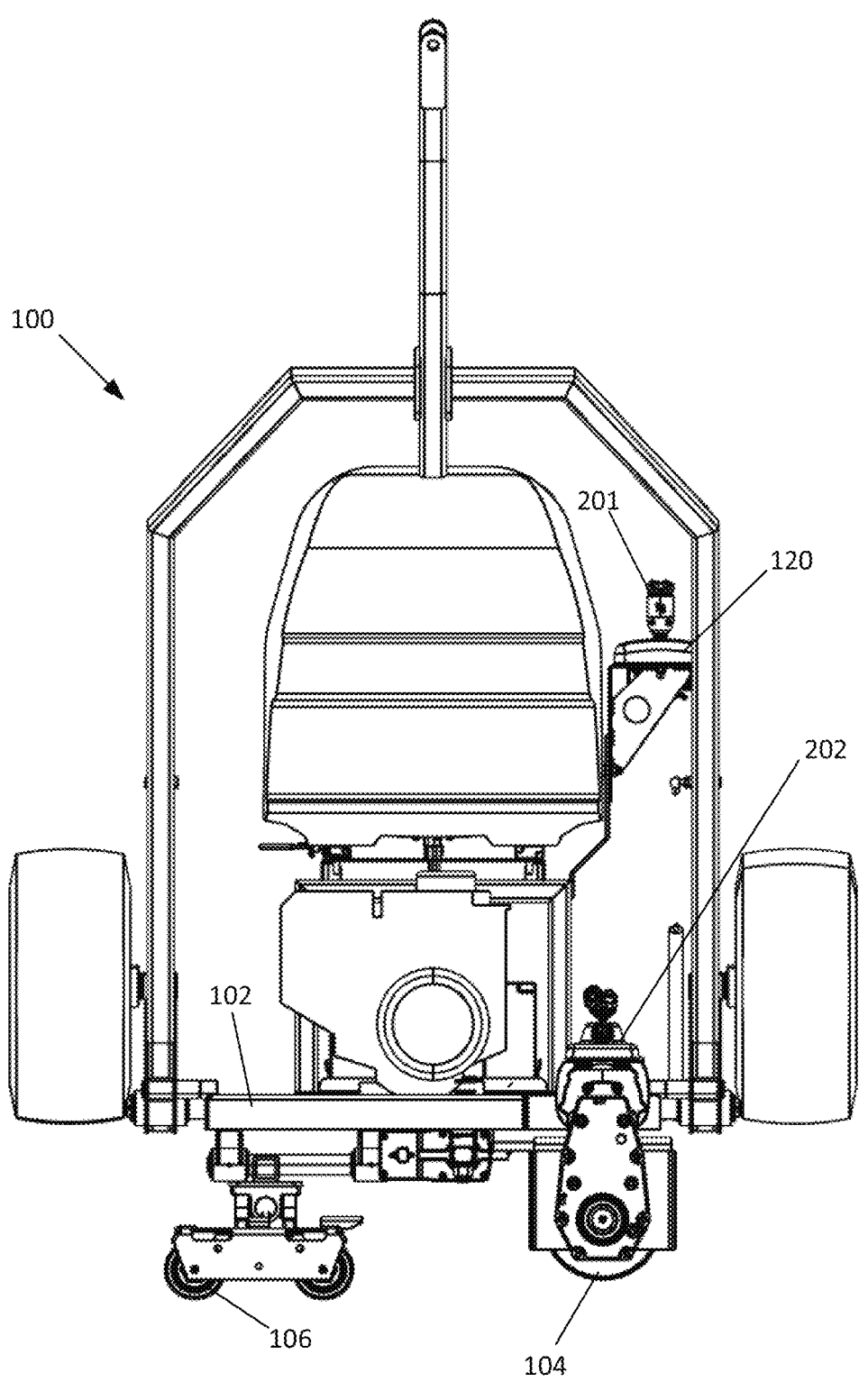

FIG. 8 is a rear view of the turf roller shown in FIG. 1 and in the configuration shown in FIG. 3.

Figure 9:
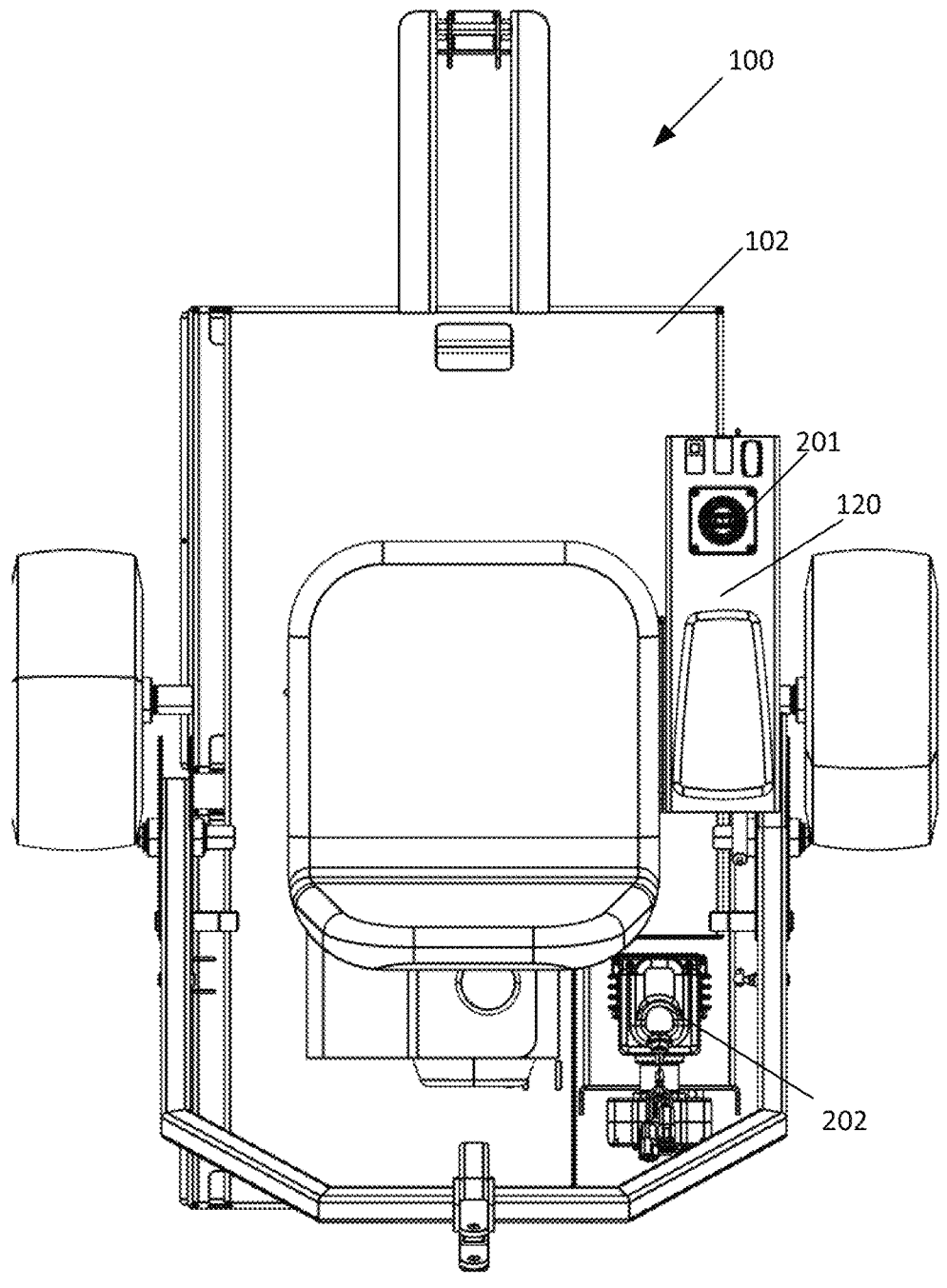

FIG. 9 is a top view of the turf roller shown in FIG. 1 and in the configuration shown in FIG. 3.

Figure 10:
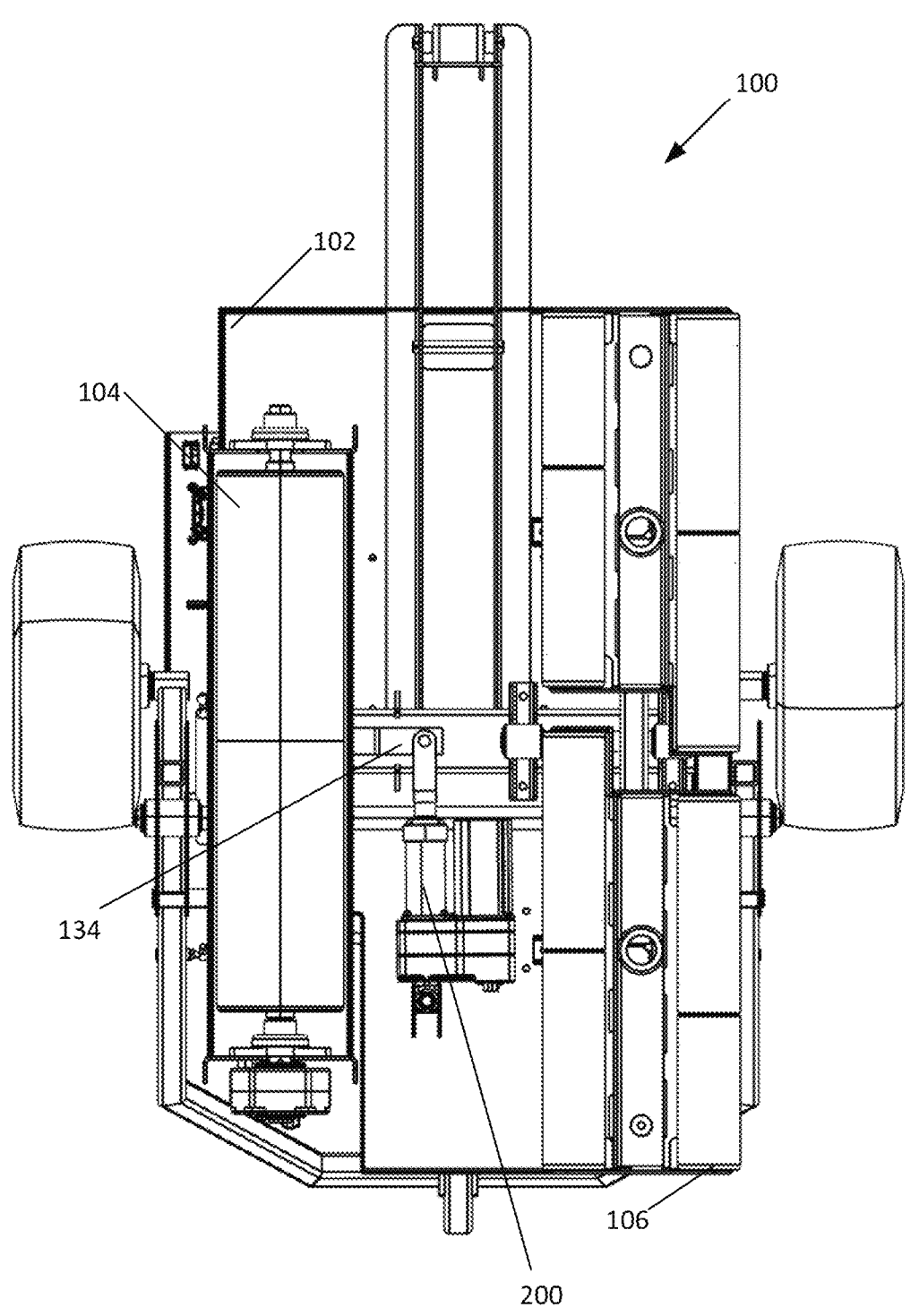

FIG. 10 is a bottom view of the turf roller shown in FIG. 1 and in the configuration shown in FIG. 3.

Figure 11:
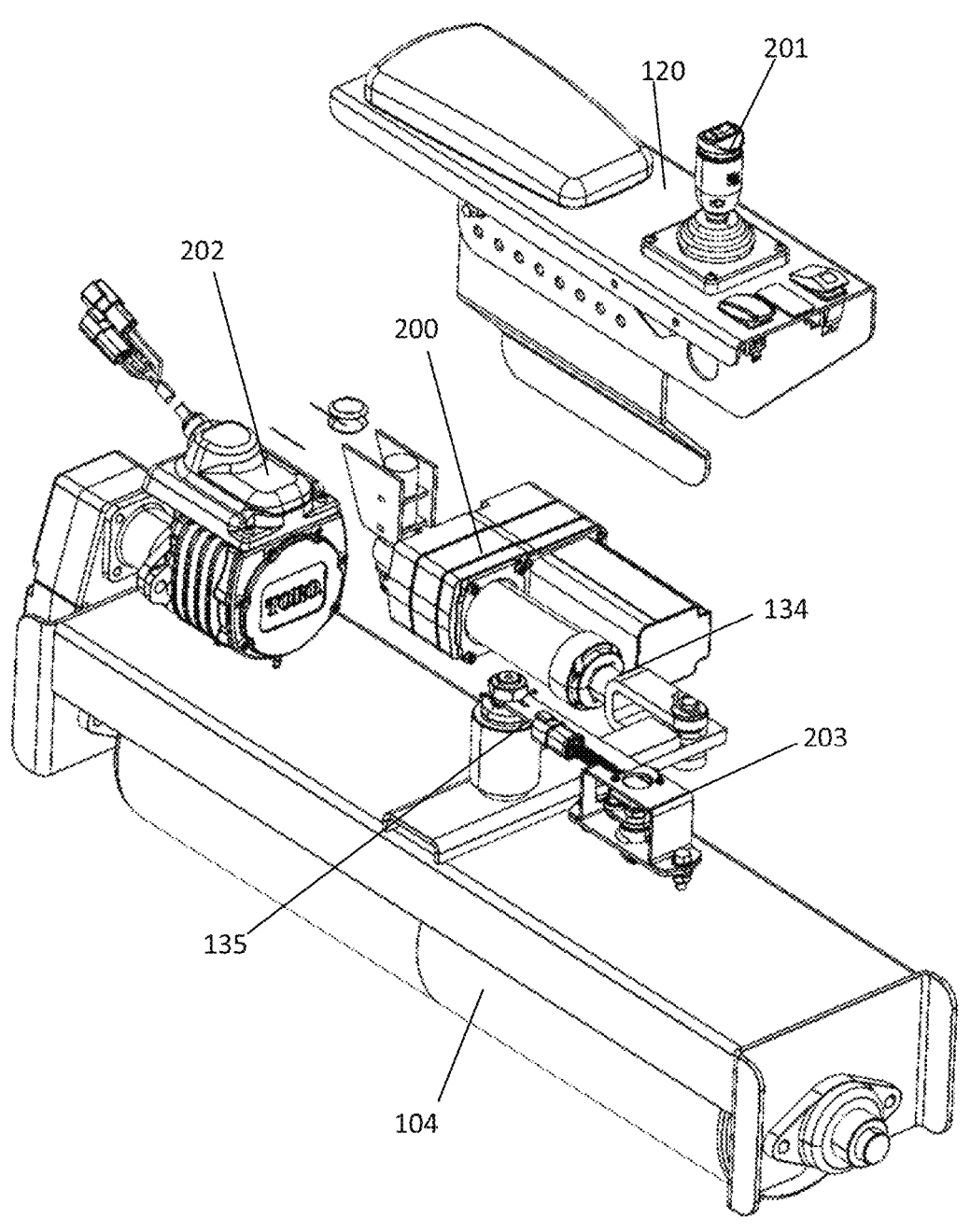

FIG. 11 is a perspective view of selected portions of the turf roller shown in FIG. 1 and in the configuration shown in FIG. 3.

Figure 12:
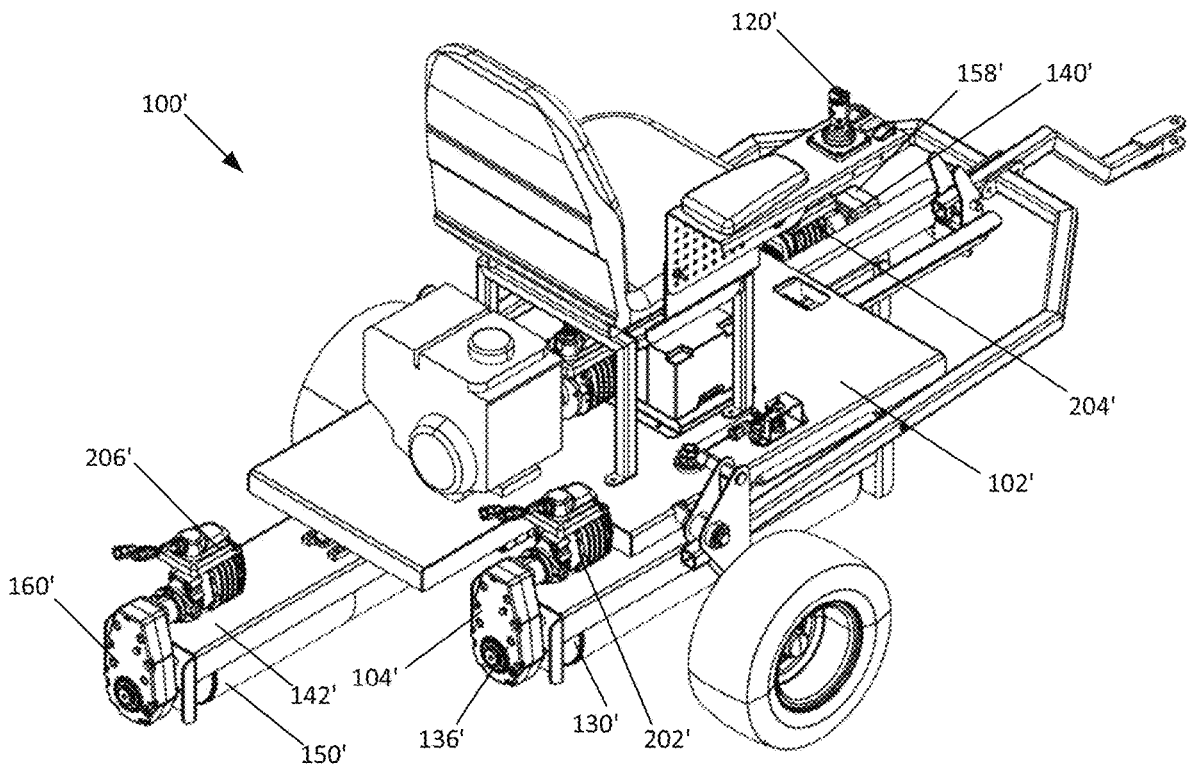

FIG. 12 is a rear top perspective view of a second example of a turf roller having features in accordance with the present disclosure, with a transport carriage rotated into a towing position.

Figure 13:
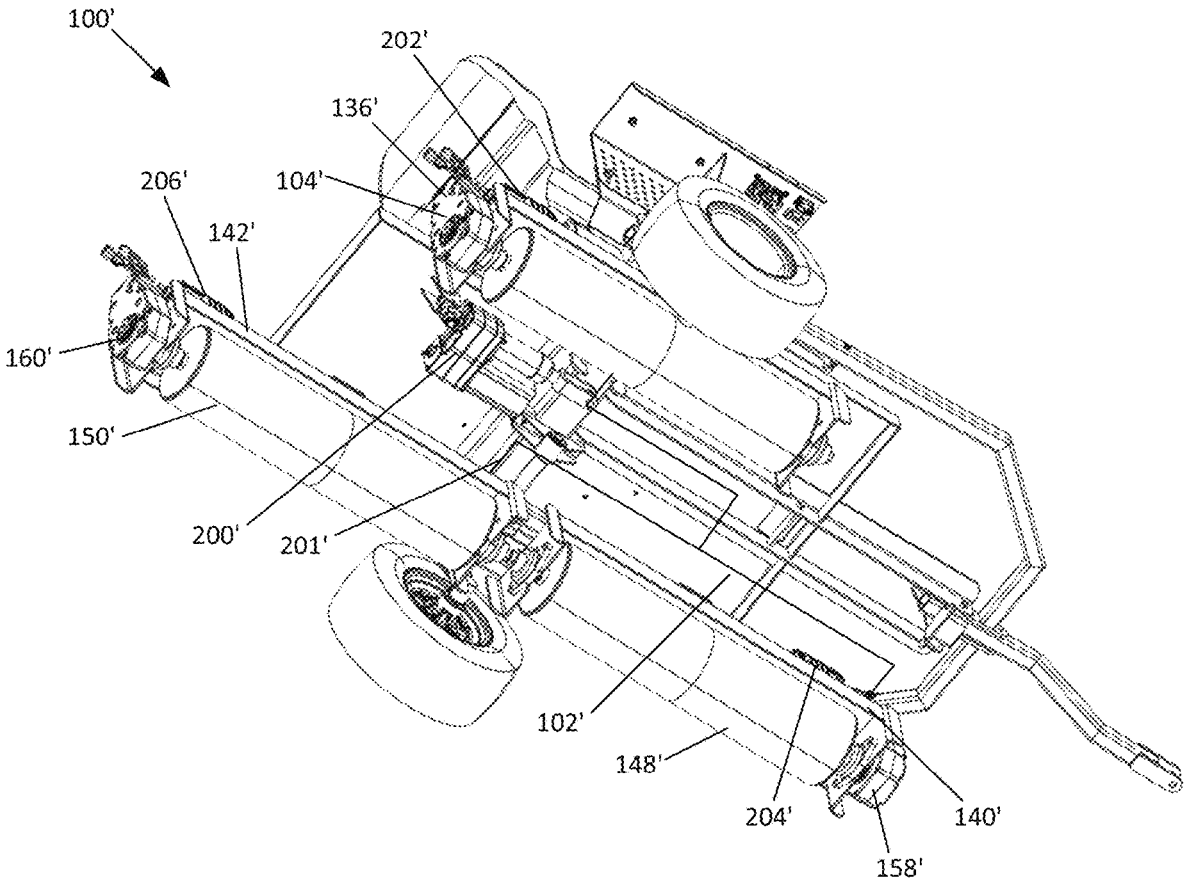

FIG. 13 is a rear bottom perspective view of the turf roller shown in FIG. 12.

Figure 14:
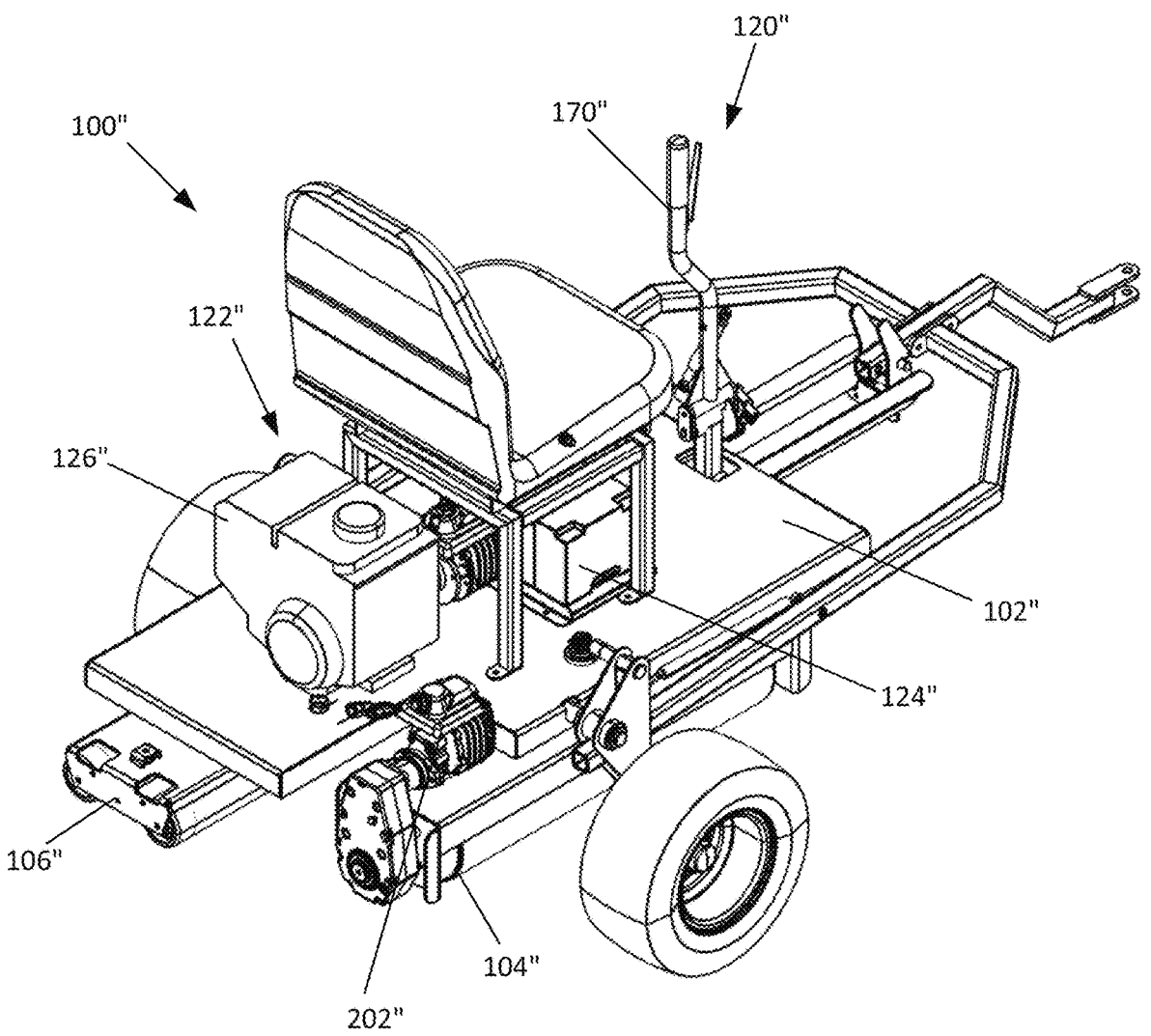

FIG. 14 is a rear top perspective view of a third example of a turf roller having features in accordance with the present disclosure, with a transport carriage rotated into a towing position.

Figure 15:
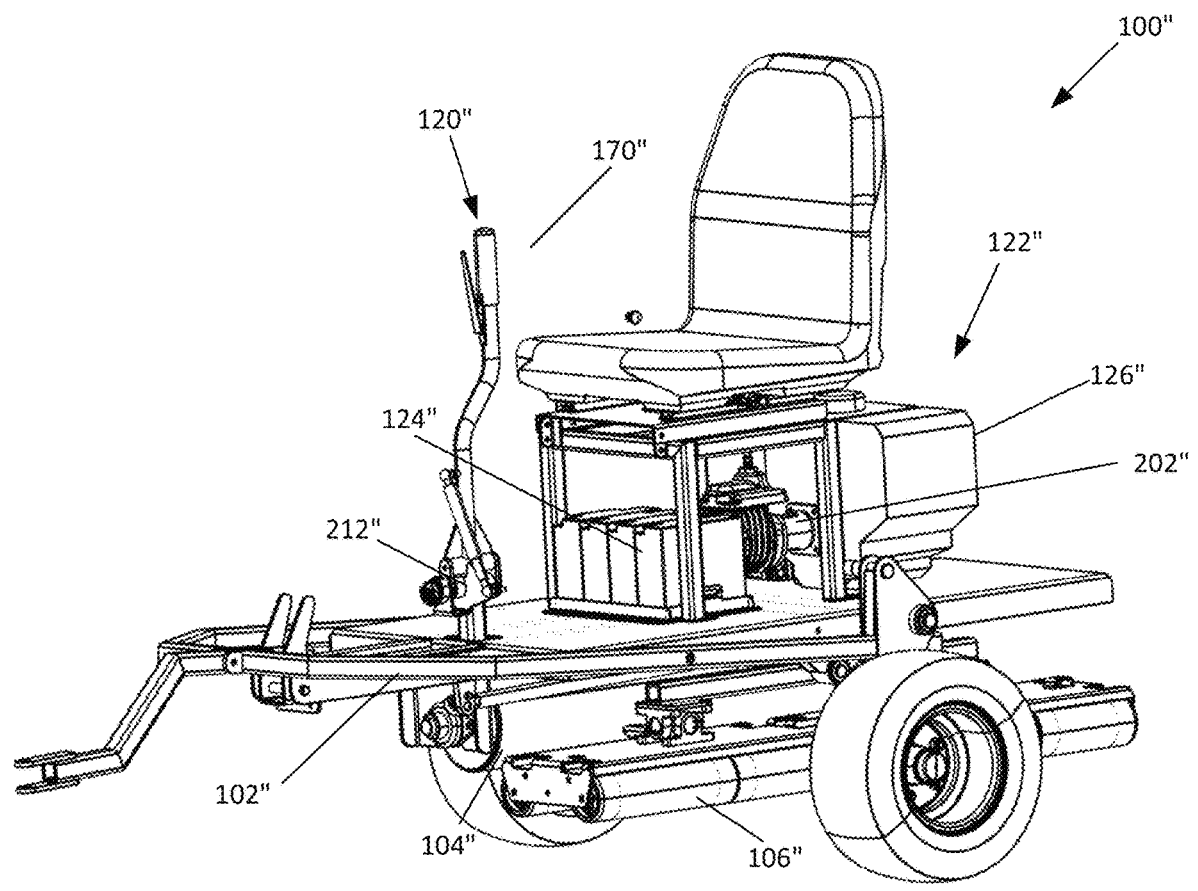

FIG. 15 is a front top perspective view of the turf roller shown in FIG. 14.

Figure 16:
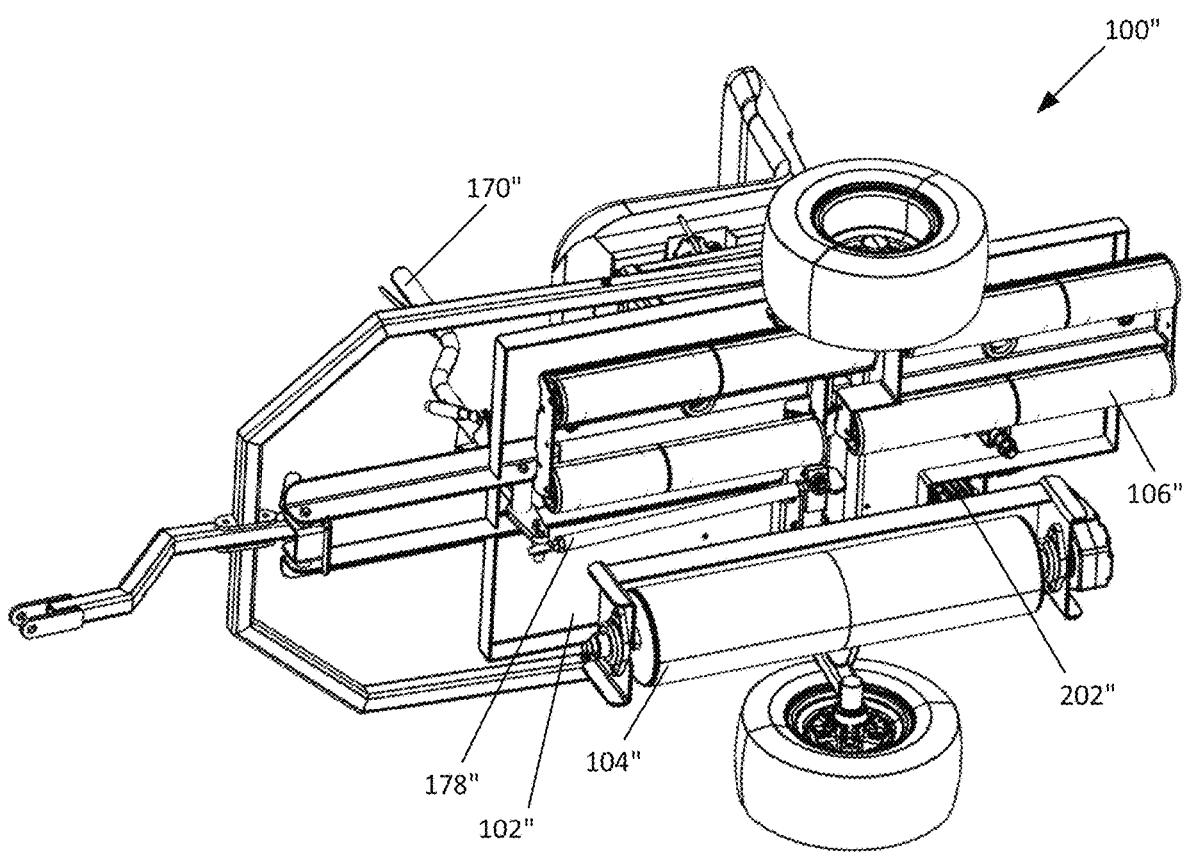

FIG. 16 is a front bottom perspective view of the turf roller shown in FIG. 14.

Figure 17:
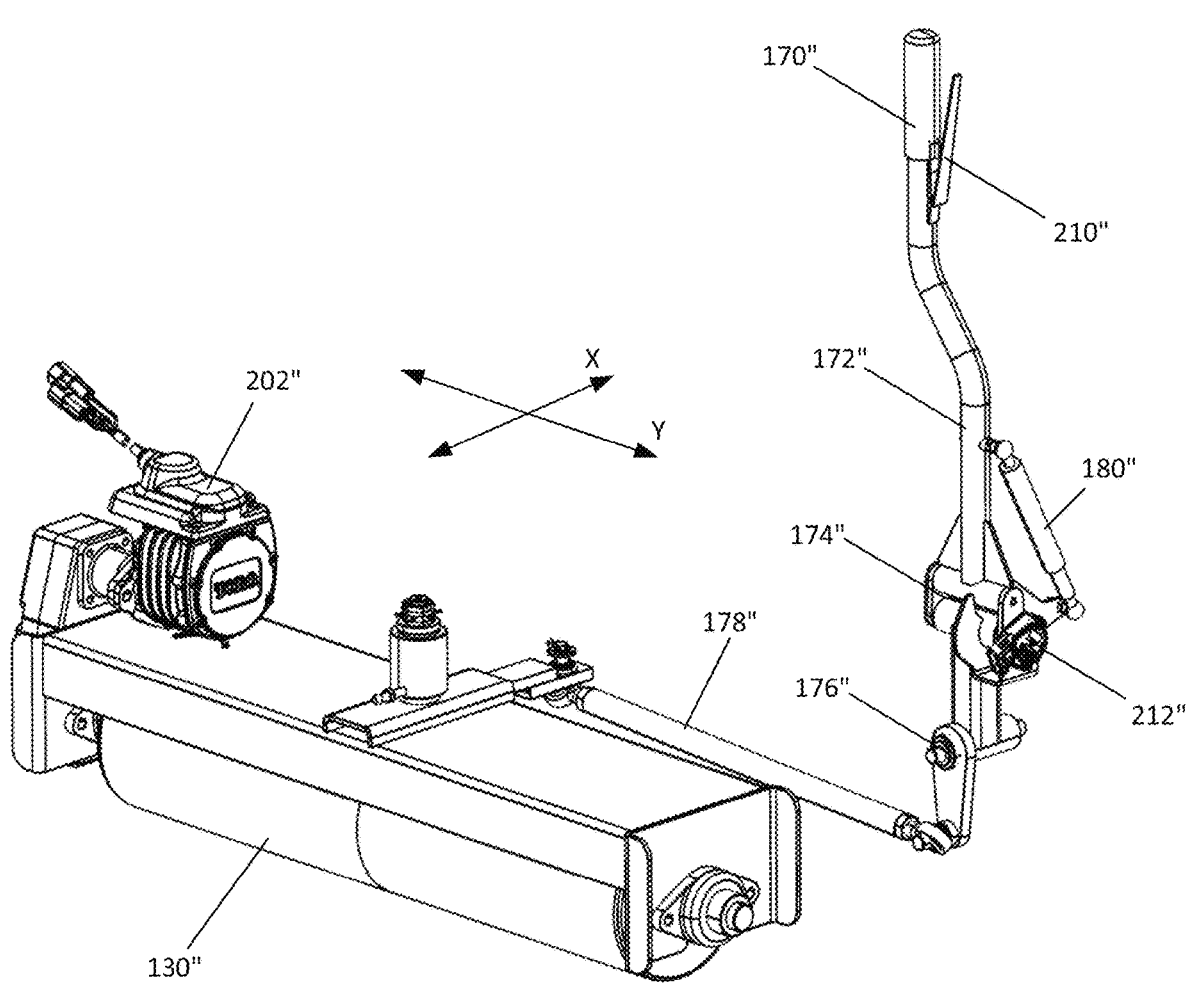

FIG. 17 is a perspective view of selected portions of the turf roller shown in FIG. 14.

Figure 18:
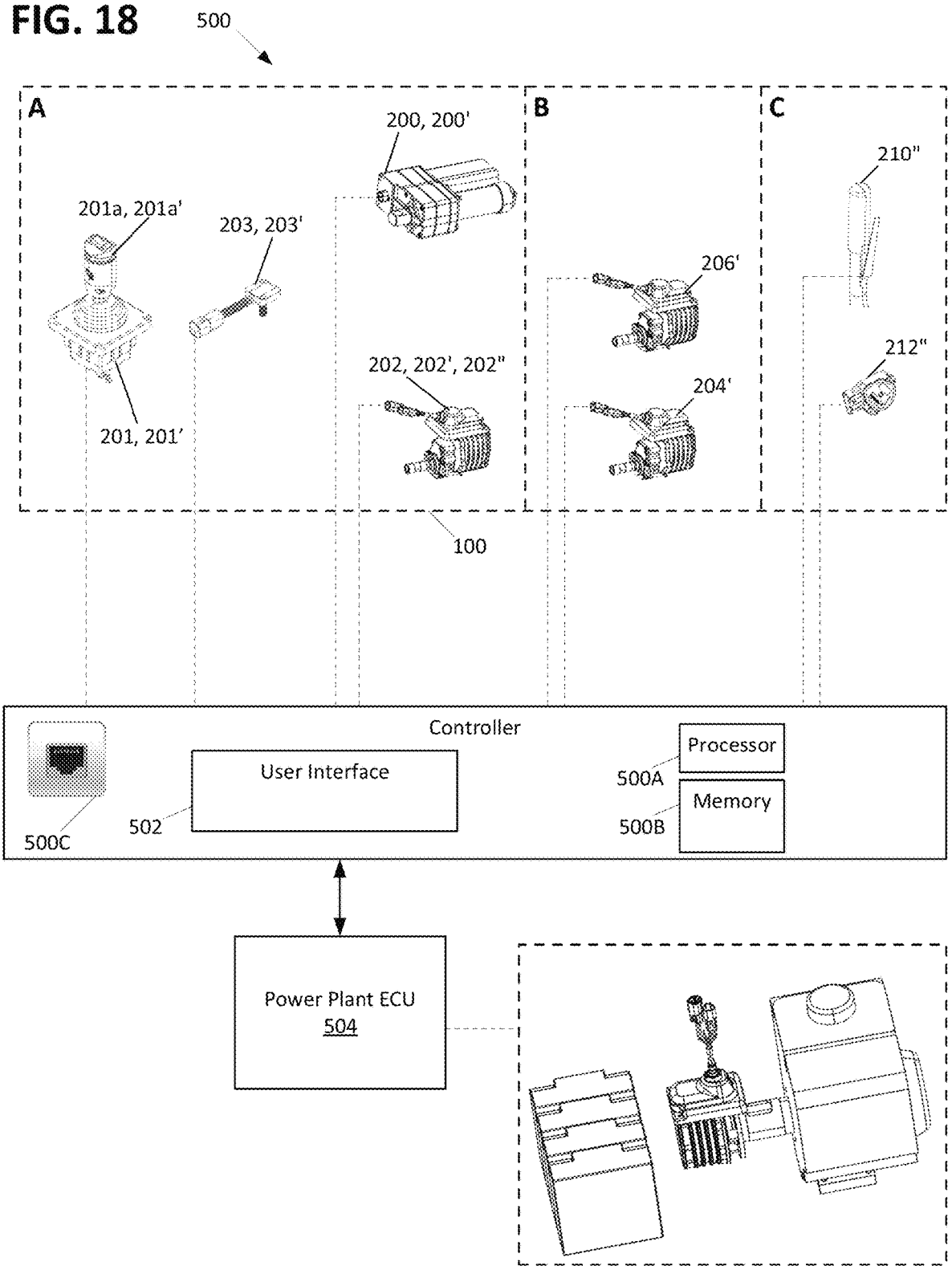

FIG. 18 is a schematic view a control system usable with the turf rollers of FIGS. 1, 12, 14, and 19.

Figures 19, 20:
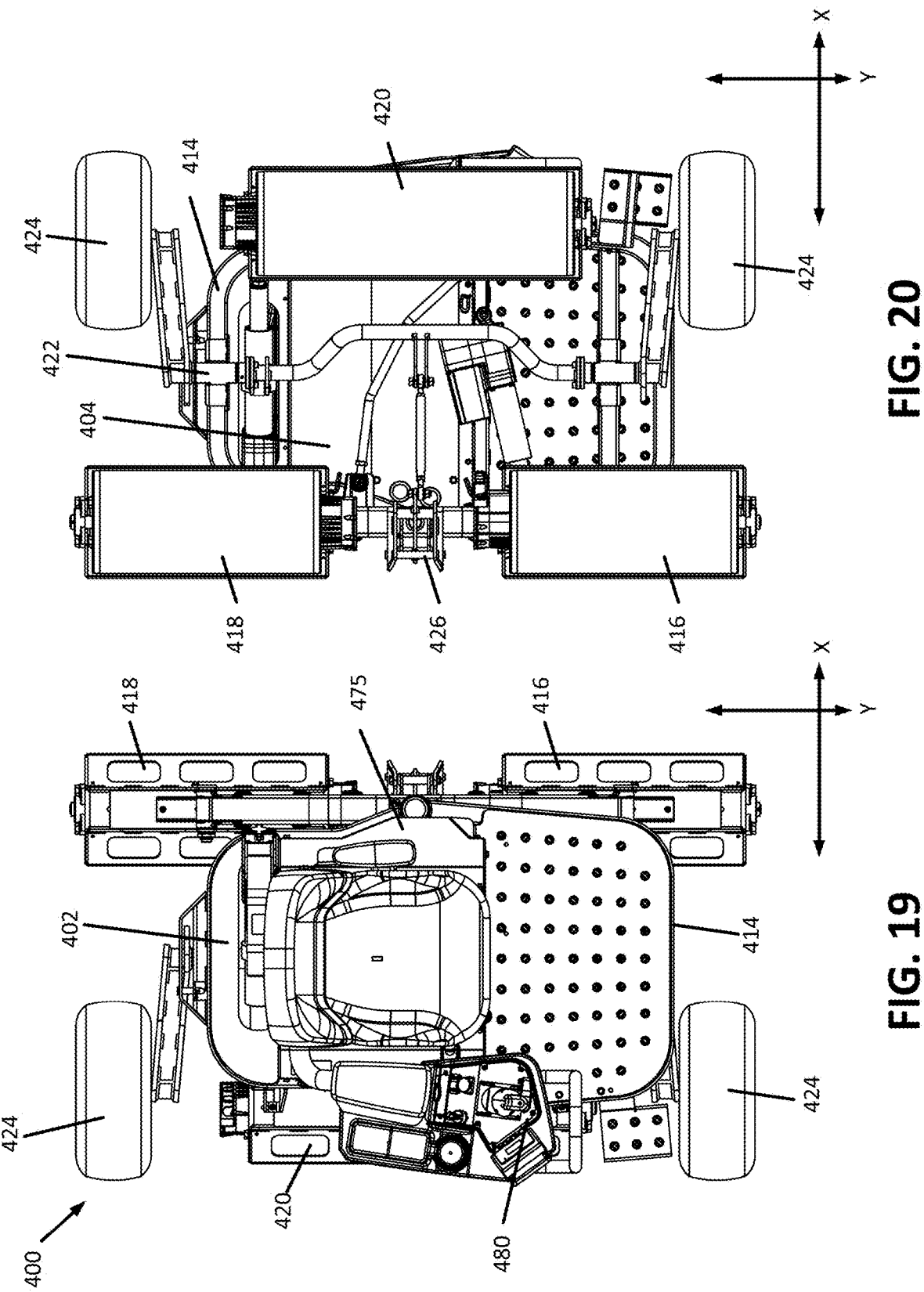

FIG. 19 is a top view of a fourth example of a turf roller having features in accordance with the present disclosure.

FIG. 20 is a bottom view of the turf roller of FIG. 19.

Figures 21, 22:
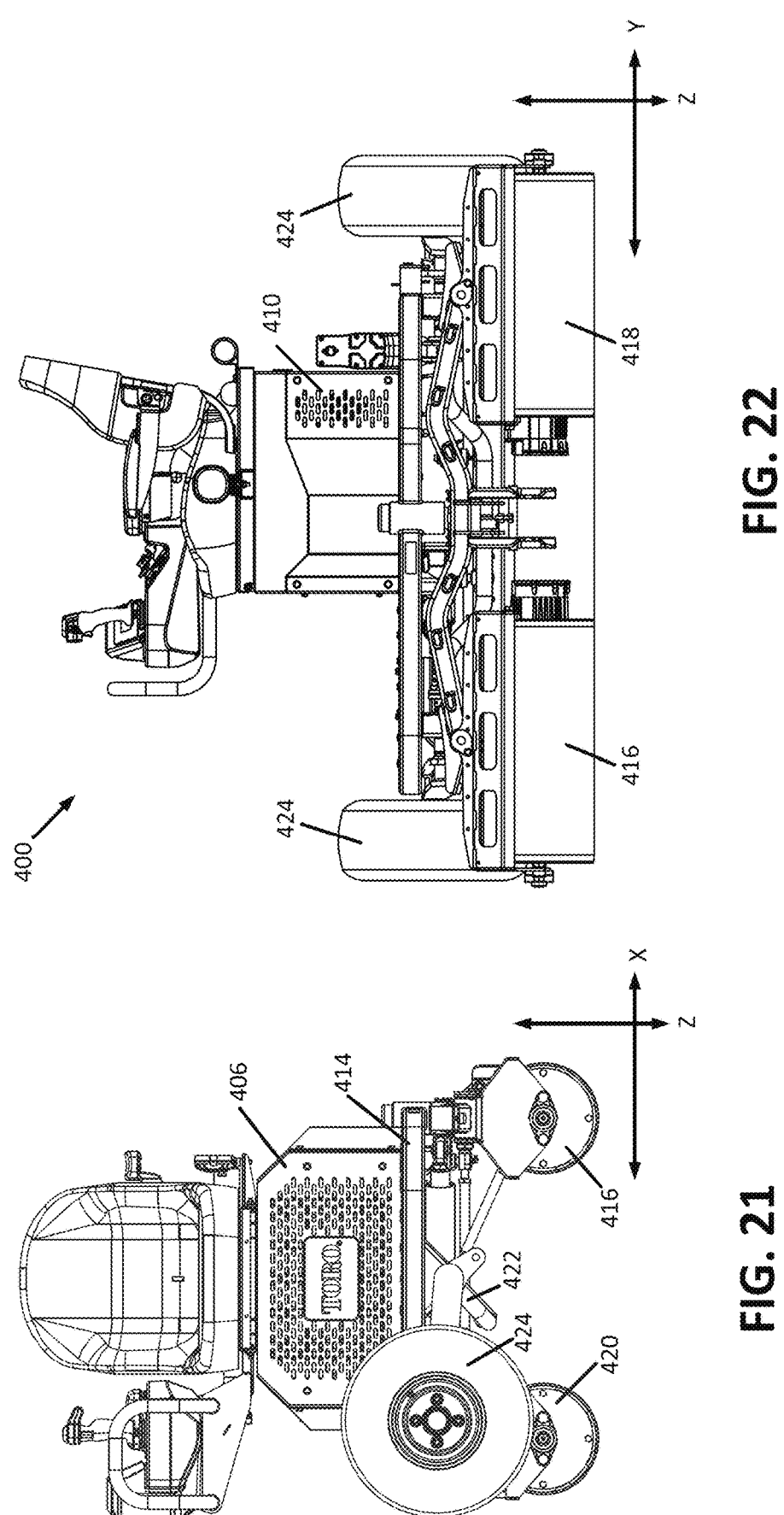

FIG. 21 is a right side view of the turf roller of FIG. 19.

FIG. 22 is a front side view of the turf roller of FIG. 19.

Figures 23, 24:
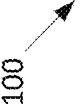

FIG. 23 is a rear side view of the turf roller of FIG. 19.

FIG. 24 is a left side view of the turf roller FIG. 19.

Figures 25, 26, 27:
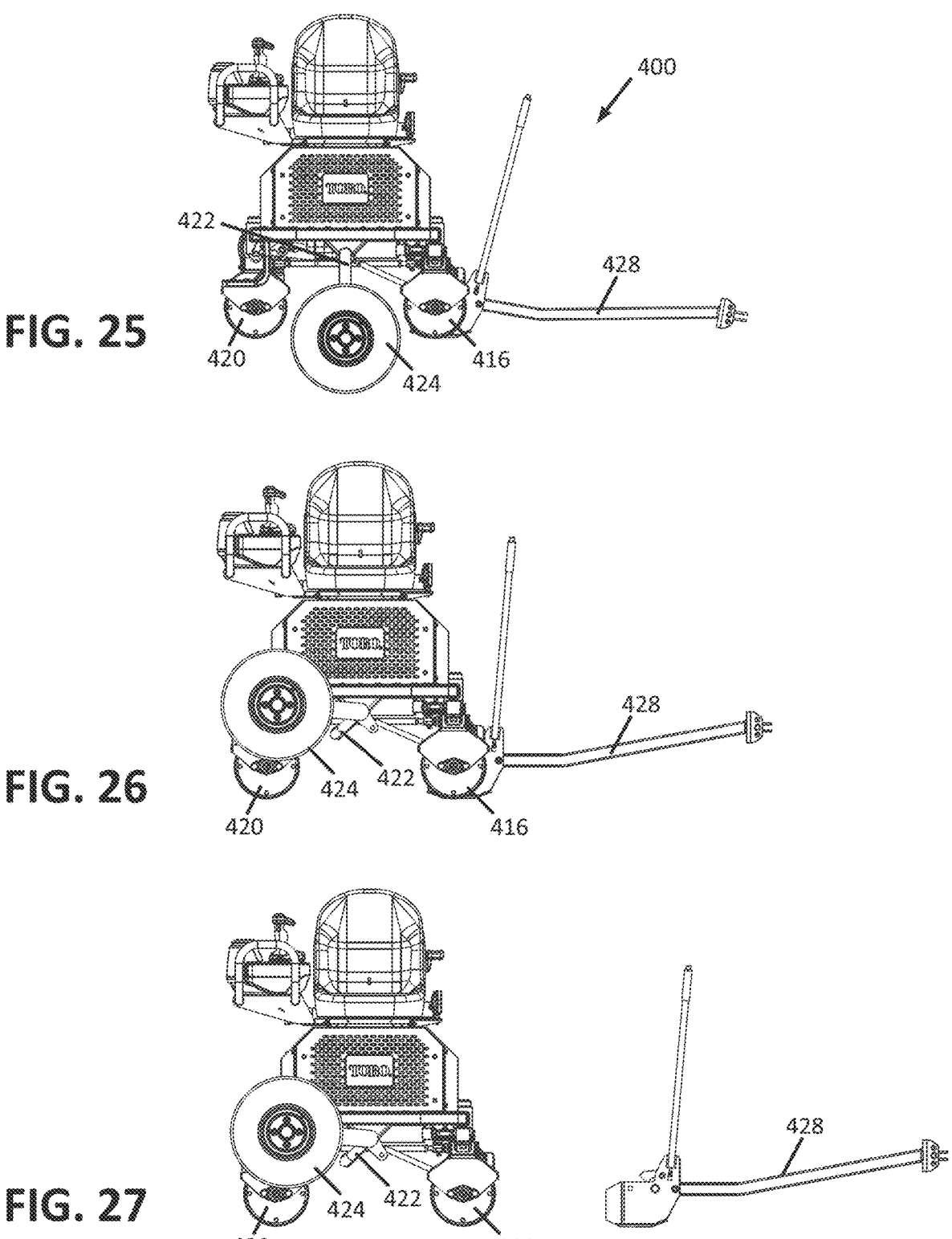

FIG. 25 is a right side view of the turf roller of FIG. 19 in a towing configuration.

FIG. 26 is a right side view of the turf roller of FIG. 19 in a towed roller configuration.

FIG. 27 is a right side view of the turf roller of FIG. 19 in a self-powered roller configuration, with a towbar detached.

Figures 28, 29, 30:
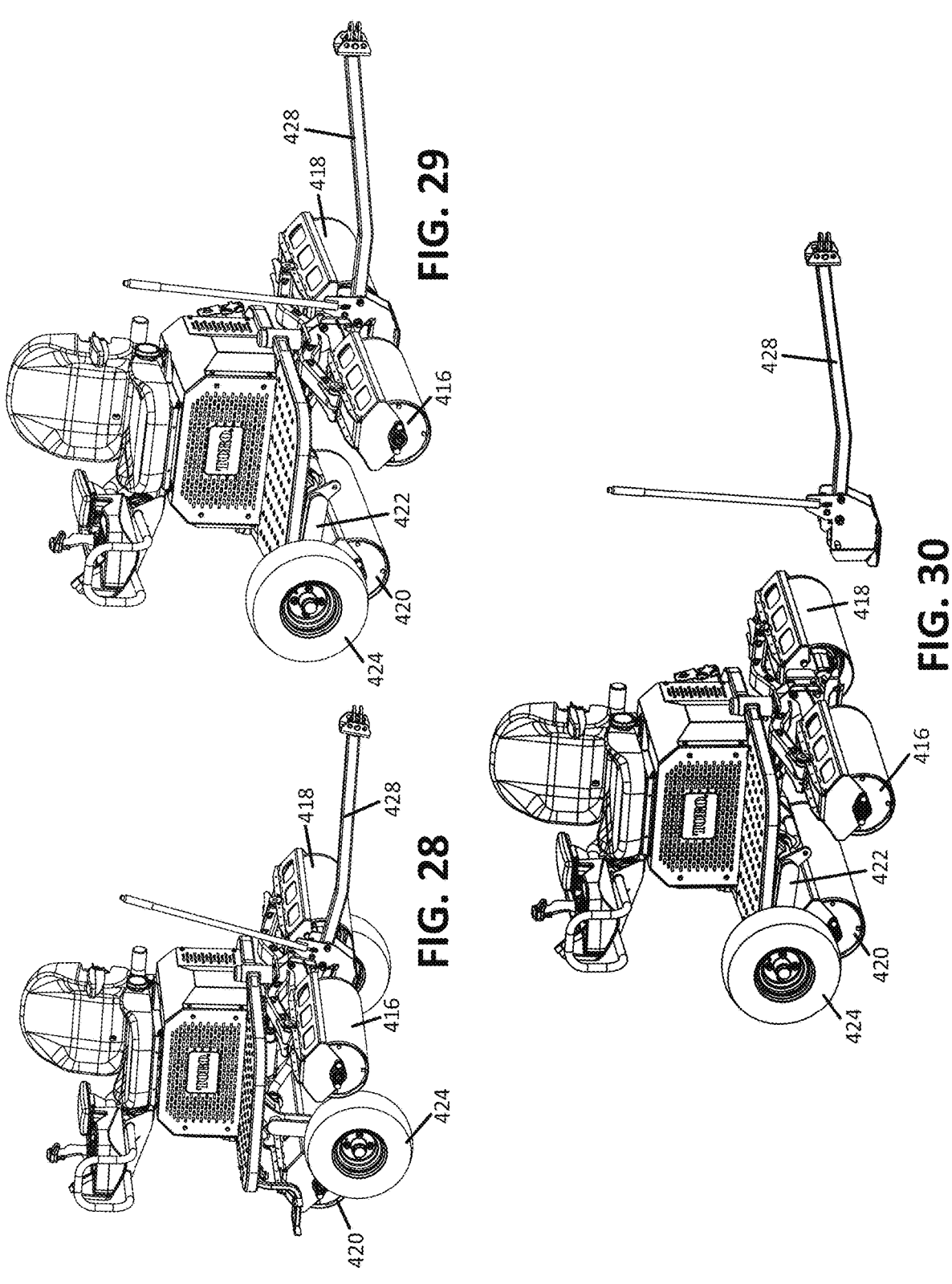

FIG. 28 is a perspective view of the turf roller of FIG. 19 in a towing configuration.

FIG. 29 is a perspective view of the turf roller of FIG. 19 in a towed roller configuration.

FIG. 30 is a perspective view of the turf roller of FIG. 19 in a self-powered roller configuration, with a towbar detached.

Figure 31:
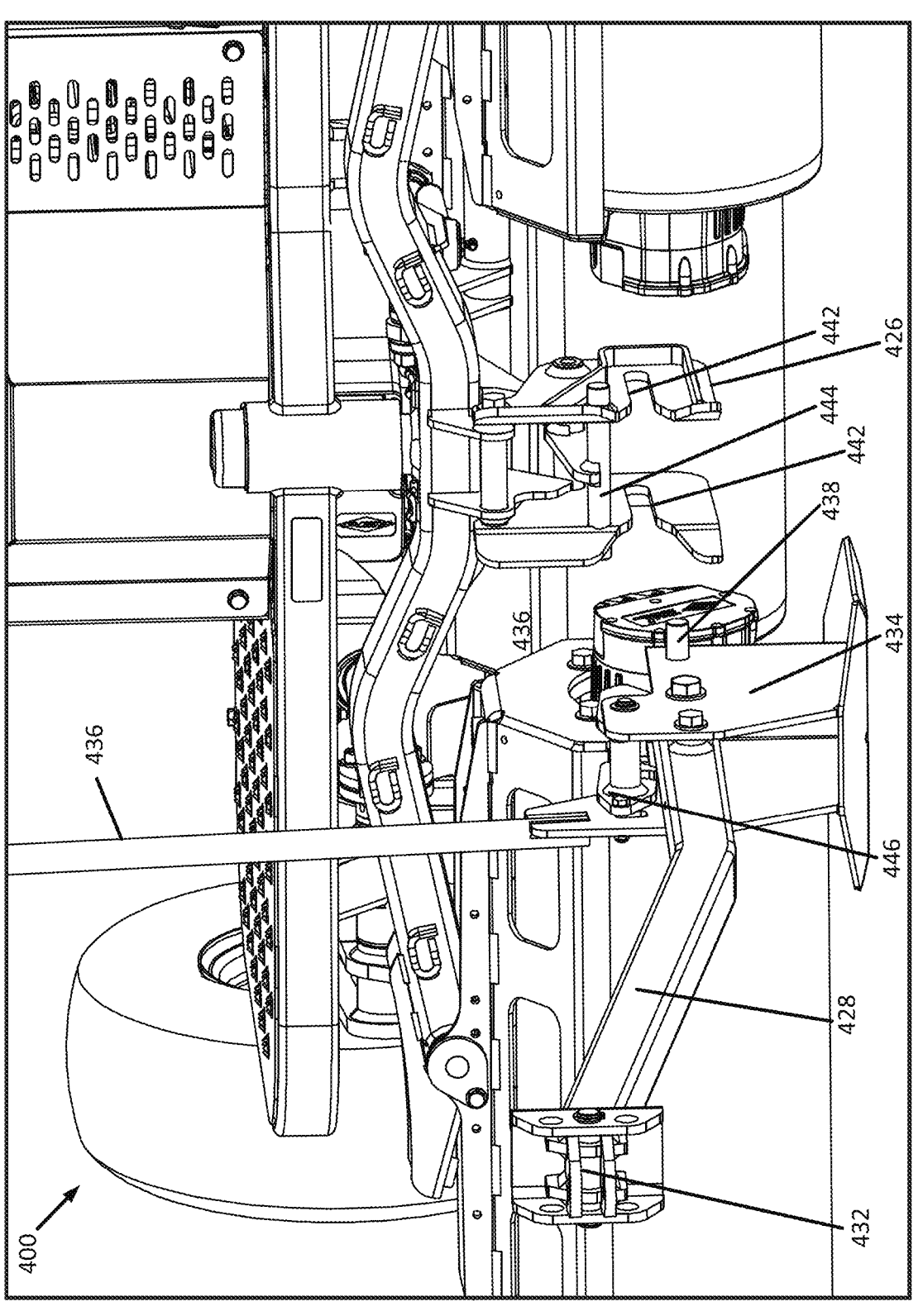

FIG. 31 is a close-up perspective view of an interconnection between a towbar and a chassis of the turf roller of FIG. 19.

Figure 32:
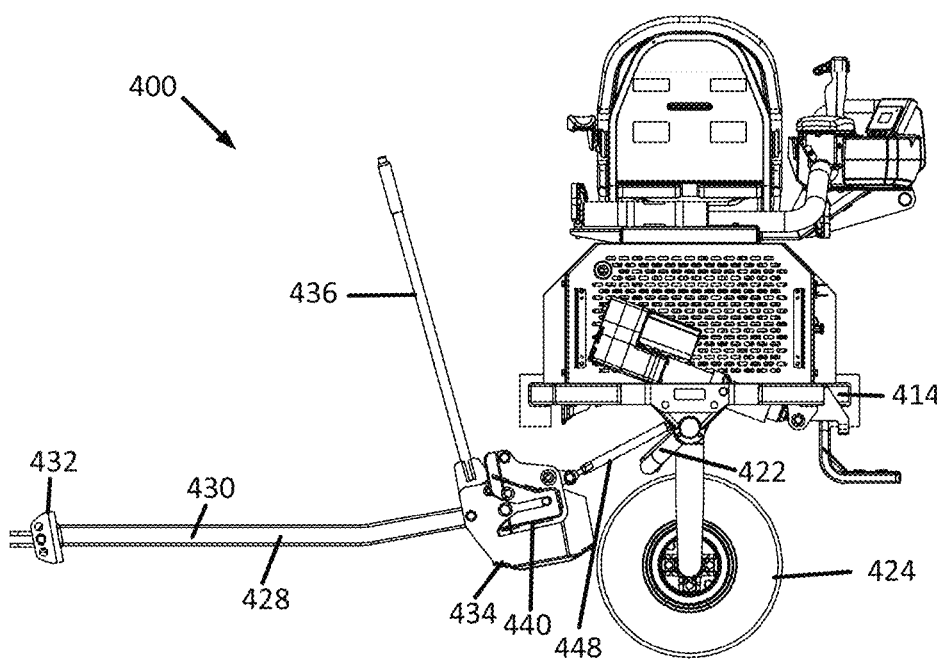

FIG. 32 is a left side view of the turf roller of FIG. 19 with the roller assemblies removed in a towing configuration with one or more wheels positioned in ground engaging contact.

Figure 33:
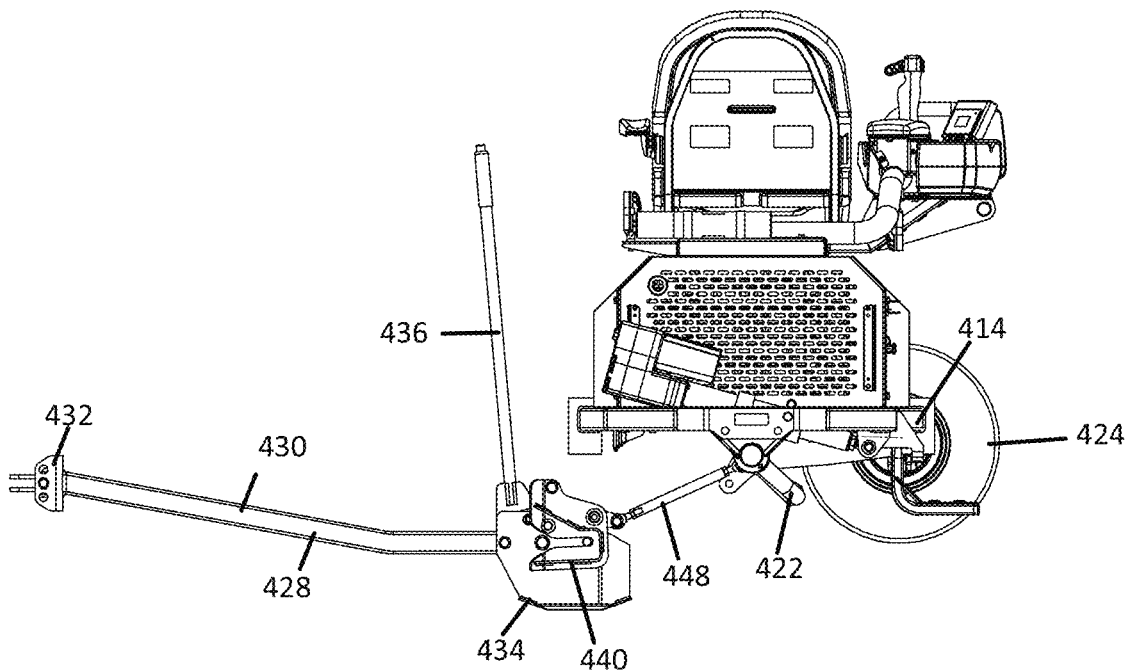

FIG. 33 is a left side view of the turf roller of FIG. 19 in a towed roller configuration, with the one or more wheels positioned above the ground, in non-engaging contact.

Figure 34:
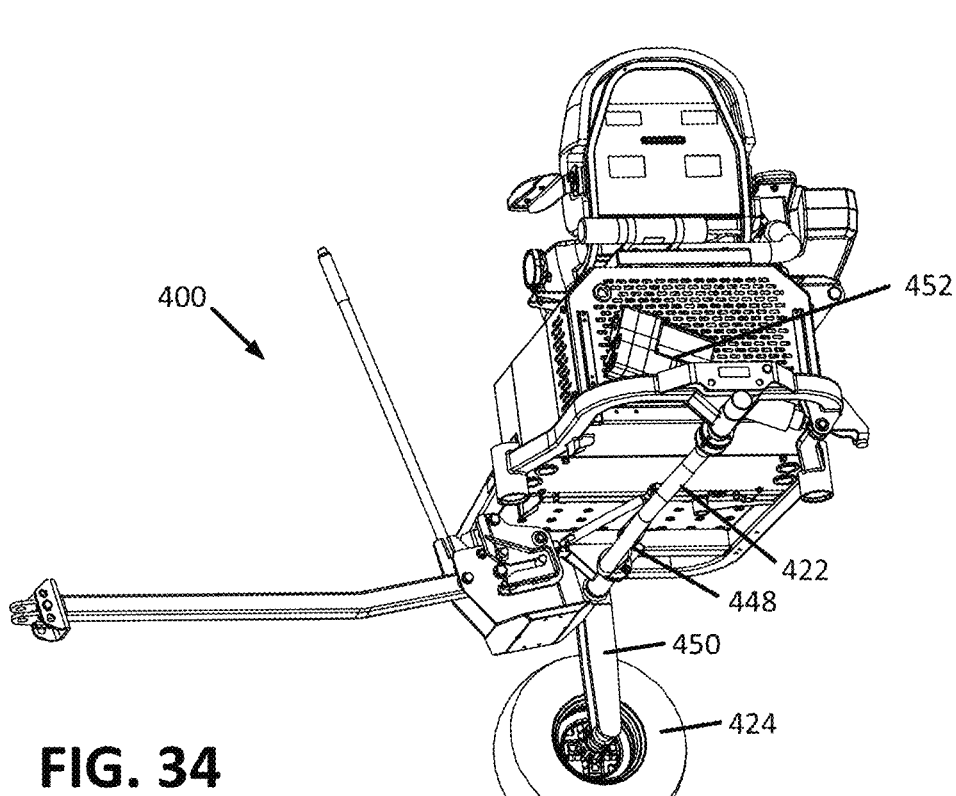

FIG. 34 is a cross-sectional perspective view of the turf roller of FIG. 19 with the roller assemblies removed in a towing configuration with one or more wheels positioned in ground engaging contact.

Figure 35:
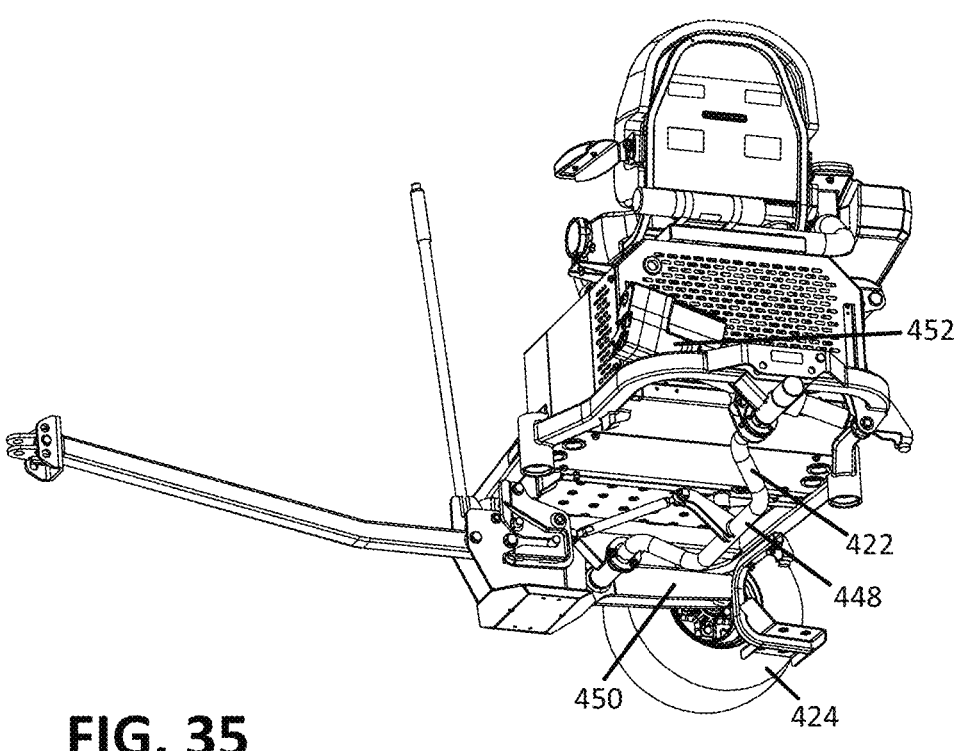

FIG. 35 is a cross-sectional perspective view of the turf roller of FIG. 19 in a towed roller configuration, with the one or more wheels positioned above the ground, in non-engaging contact.

Figure 36:
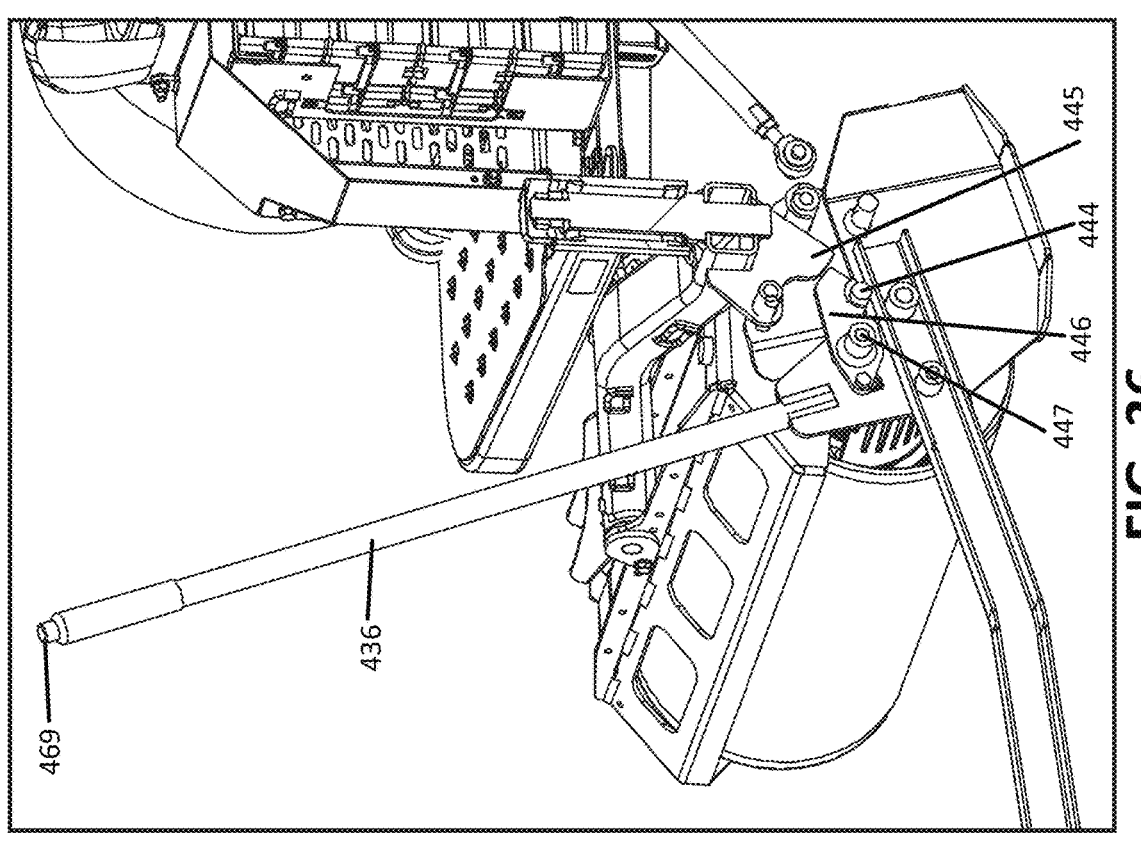

FIG. 36 is a close up, cross-sectional perspective view depicting interaction between a latch grip and portions of the chassis of the turf roller of FIG. 19 in the towing configuration.

Figure 37:
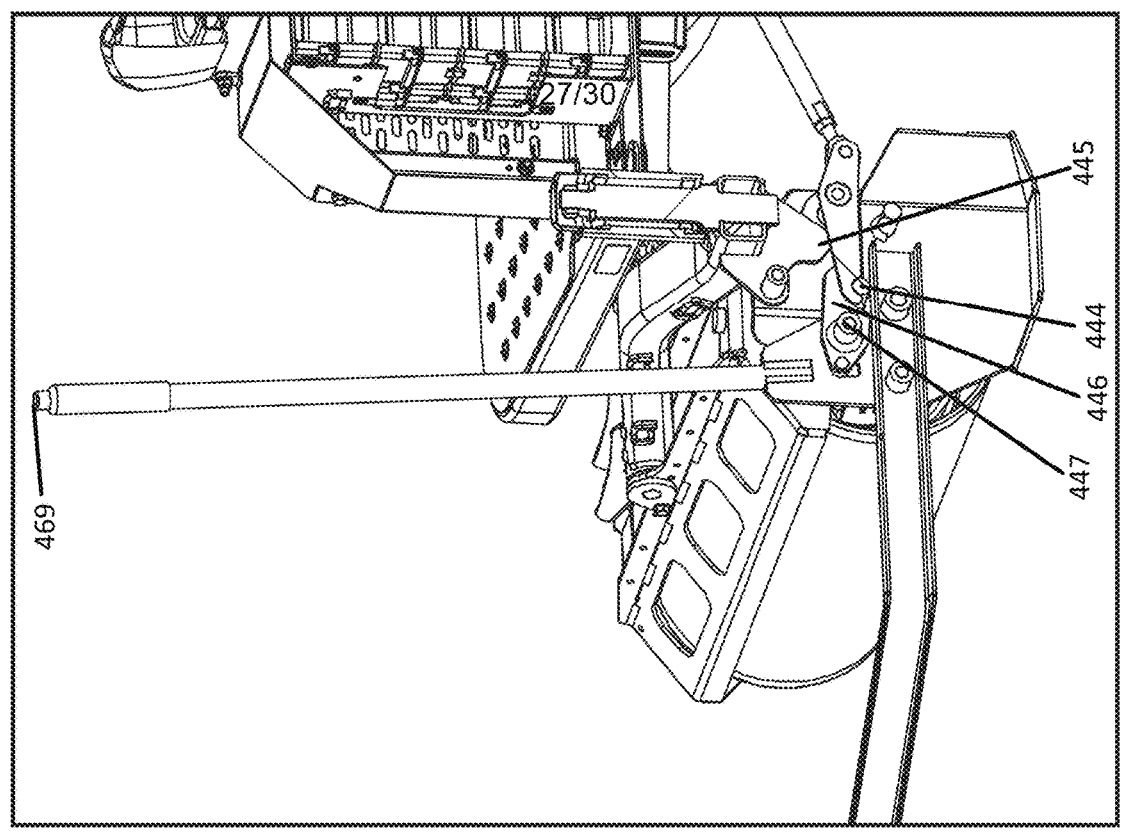

FIG. 37 is a close up, cross-sectional perspective view depicting interaction between a latch grip and portions of the chassis of the turf roller of FIG. 19 in the towed roller configuration.

Figure 38:
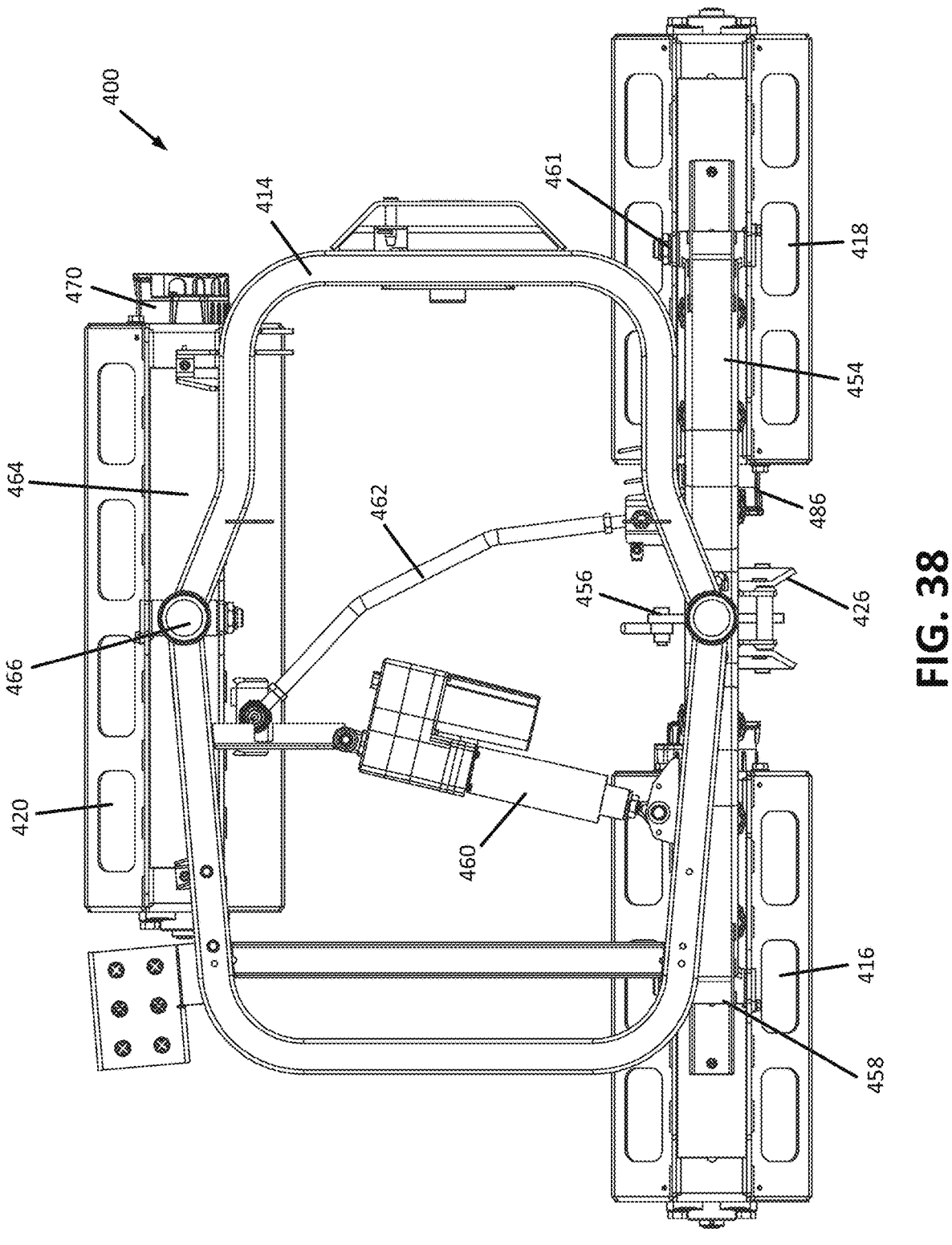

FIG. 38 is a top view showing steering linkage aspects of the turf roller of FIG. 19.

Figure 39:
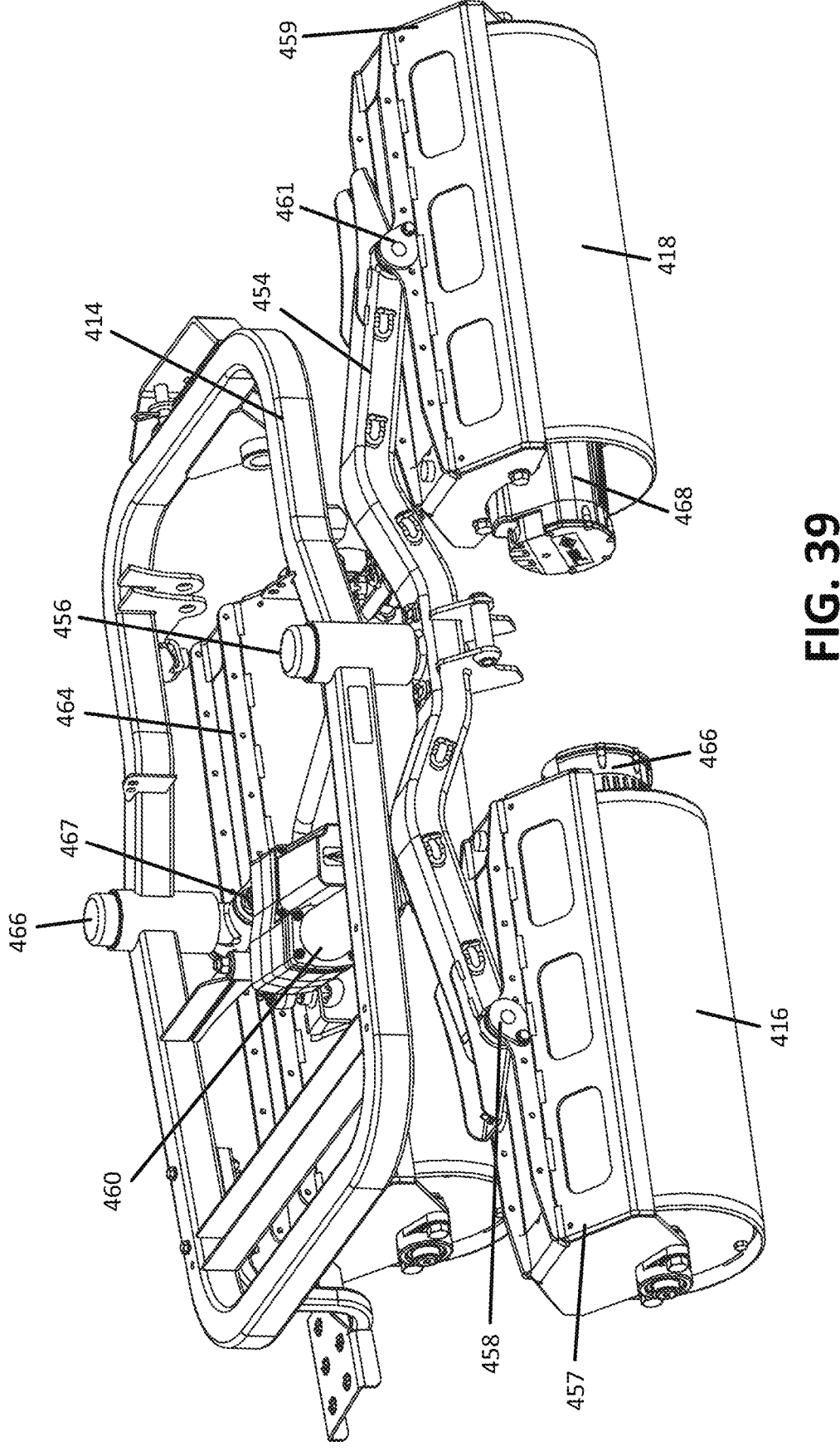

FIG. 39 is a perspective view showing steering linkage aspects of the turf roller of FIG. 19.

Figure 40:
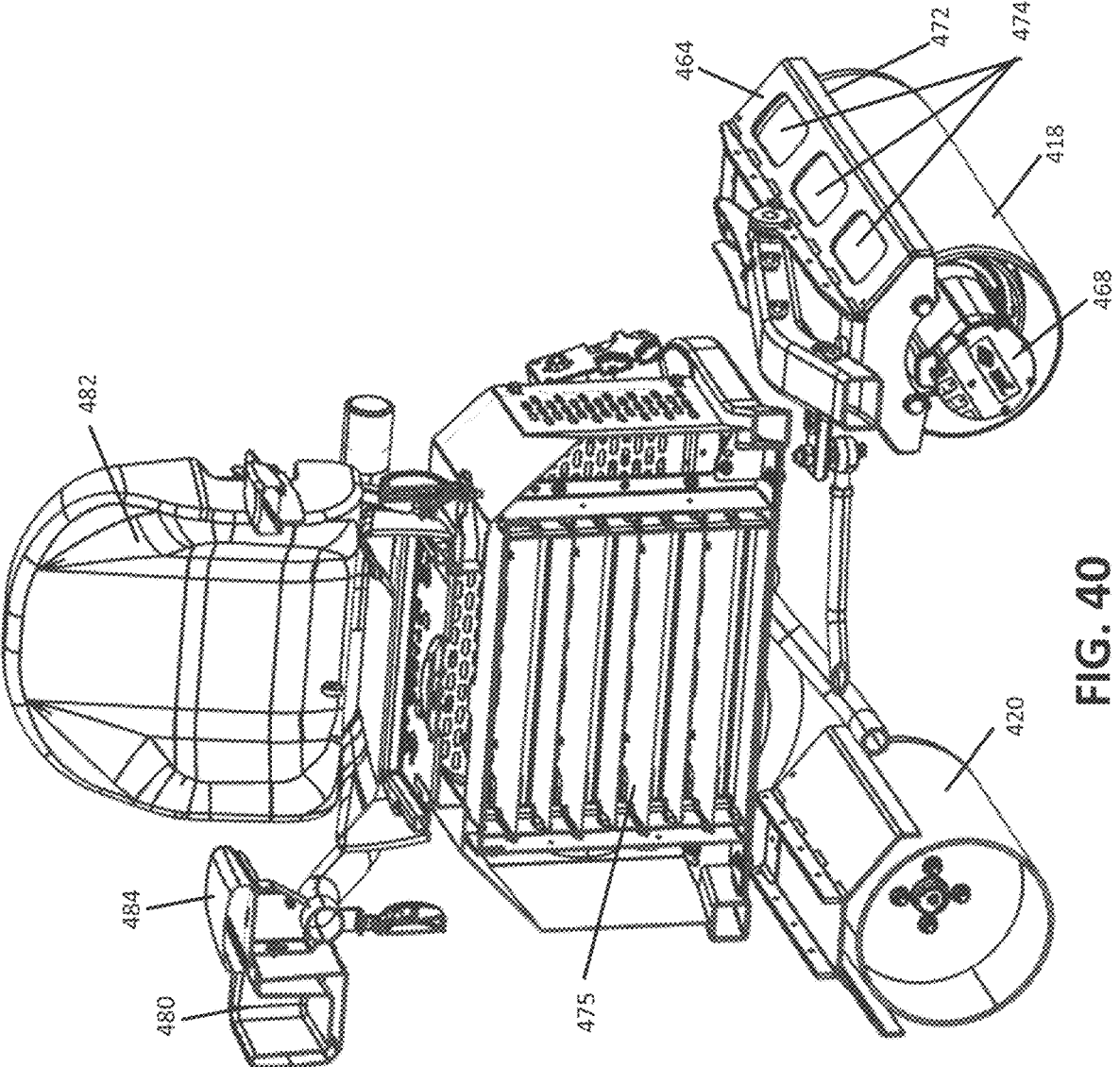

FIG. 40 is a cross-sectional view of a roller assembly of the turf roller of FIG. 19 including a internally mounted drive motor.

DETAILED DESCRIPTION

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Figure 2:
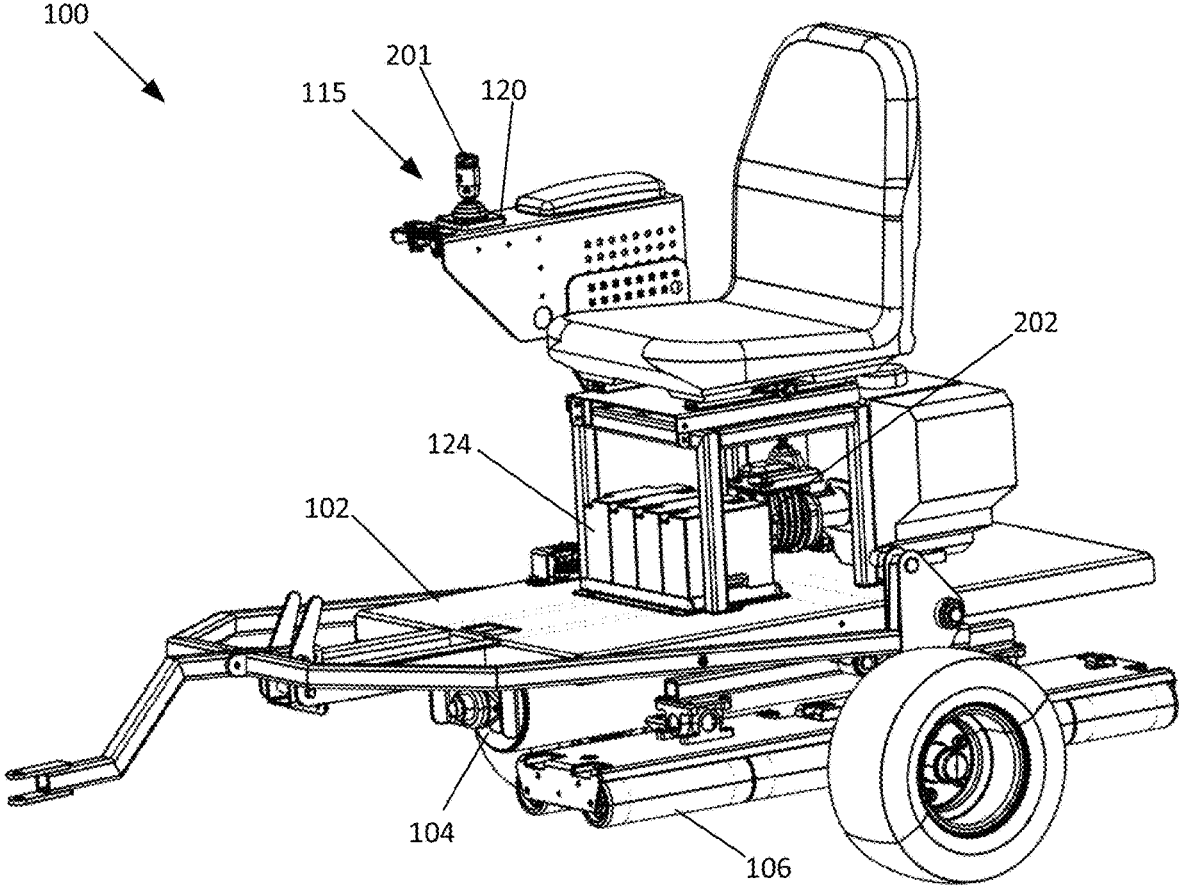
FIG. 2 is a front top perspective view of the turf roller shown in FIG. 1.

Referring to FIGS. 1 to 11, an example turf roller 100 in accordance with the present disclosure is presented. In one characterization, the turf roller 100 has longitudinal axis X and an orthogonal lateral axis Y, as illustrated on FIG. 1. The turf roller primarily travels along the longitudinal axis X with the operator seated and facing along the lateral axis Y. As shown, turf roller 100 includes a chassis 102 and a pair of roller assemblies 104, 106. As shown at FIGS. 1 and 2, the turf roller 100 is supported by a transport carriage 108 and is shown as being in a towing position. In one aspect, the turf roller 100 has a rotatable frame 110, a pair of wheels 112, and a towing hitch 114. In the towing position shown at FIGS. 1 and 2, the turf roller 100 can be connected to a tow vehicle via the towing hitch 114 and transported via wheels 112 with the roller assemblies 104, 106 suspended above the ground. FIGS. 3 to 10 show the transport carriage 108 rotated into a storage position such that the wheels 112 are lifted, which enables the roller assemblies 104, 106 to contact the ground. In this position of the transport carriage 108, the turf roller 100 can be said to be in an operating position. Notably, when the turf roller 100 is in the towing position, the turf roller can be transported in a direction along axis Y of the turf roller 100. As the roller assemblies 104, 106 rotate about an axis that is parallel to the axis Y, the turf roller 100 travels primarily along the axis X when in the operating position. In some examples, the turf roller 100 is provided without a transport carriage 108. In such instances, the turf roller 100 can be transported on a separate trailer, if desired.

With continued reference to FIGS. 1 to 11, the turf roller 100 is further shown as including an operator station 115 including a seat 116, an arm rest 118, and an input control station 120 supported by the arm rest 118. In one aspect, the input control station 120 includes a joystick assembly 201 for controlling direction and speed of the turf roller 100. In one aspect, the joystick assembly 201 advantageously provides an operator with single-hand control of both direction and speed. By use of the term "single-hand control" it is meant a control configuration operable with only one hand and without the use of the operator's feet. In the example shown, the joystick assembly 201 is located on a right-hand side of the operator seat 116 such that the operator can operate the joystick using the operator's right hand. Alternatively, the joystick assembly 201 can be provided on a left-hand side of the operator or centrally between the legs or forward of the operator, as shown at FIG. 17.

The turf roller 100 is also provided with a power plant 122 including a rechargeable battery station 124 including one or more batteries 124a. As explained in further detail later, the power plant 122 provides power to the roller assembly 104 and to the control system of the turf roller 100, including the input control station 120. The turf roller 100 can be configured for fully electric operation such that the power plant 122 includes only the battery station 124. In the example presented, the power plant 122 is additionally shown as being provided with an internal combustion engine 126 and a motor/generator 128 such that the turf roller 100 is provided with a hybrid power plant. In such a configuration, the internal combustion engine 126 drives the motor/generator 128 to charge the battery station 124, as needed based on a charge state of the battery station 124. In some examples, the power plant 122 can exclude the battery station such that only an internal combustion engine is provided. In such a configuration, the power plant 122 can be additionally configured with a hydraulic motor/pump that provides hydraulic fluid power to the roller assembly 104 in which fluid flow is controlled by one or more control valves associated with the control system.

In one aspect, the roller assembly 104 includes a roller 130 rotatably supported by a frame structure 132 such that the roller 130 can rotate with respect to the frame structure 132. In turn, the frame structure 132 is rotatably mounted to the frame assembly 102, via a joint connection 133, such that the roller can be pivoted about an axis Z to change the angular position of the roller 130 and to steer the turf roller 100. A linkage assembly 134 operably connects the frame structure 132 to a first powered actuator 200, mounted to the chassis 102, to enable the operator to steer the turf roller 100 via the input control station 120. In the example shown, the first actuator 200 is an electrically powered linear actuator. However, other types of actuators are possible, such as rotary actuators and/or hydraulic actuators. In the example shown, a position sensor 203 configured to detect a steering position, via a linkage 135, of the roller 130 is provided as feedback to the control system. The actuator 200 is also provided with an internal position sensor that can be used as feedback instead of or in conjunction with the position sensor 203. As discussed later, with respect to the embodiment presented at FIGS. 14 to 17, a mechanical linkage can also be used by an operator to steer the roller assembly 104 without the use of a powered actuator. A drive assembly 136 operably connects the roller to a second powered actuator 202, mounted to the frame structure 132, to enable the operator to drive the turf roller 100 in forward and reverse directions. The drive assembly 136 is shown as being a gear box, but can be provided in any number of configurations, such as a chain or belt drive. In some examples, the second actuator is directly coupled to the roller 130 in a direct drive arrangement in which the drive assembly 136 is omitted. As discussed later with respect to the embodiment shown in FIGS. 12 to 13, a plurality of roller assemblies 104 and rollers 130 can be provided, in some instances, in lieu of providing the roller assembly 106. In one aspect, the roller 130 is formed as a drum-type roller with an outer surface being provided with a rubber or rubber-type material.

In one aspect, the roller assembly 106 includes a frame structure 138 supporting a first roller sub-assembly 140 and a second roller sub-assembly 142. The frame structure 138 is configured to pivot about an axis, via a joint connection 152, parallel to the axis X. Each of the sub-assemblies 140, 142 includes frame structures 144, 146 that are rotatably mounted to the frame structure 138, via universal or ball joint connections 154, 156 such that the frame structures are able to rotate with respect to the frame structure 138 about multiple axes. The frame structures 144, 146 respectively rotatably support a plurality of first rollers 148 and a plurality of second rollers 150 such that the rollers 148, 150 can rotate about an axis parallel to the axis Y. With such a configuration, the individual rollers 148, 150 can fully articulate to follow the contours of the turf surface upon which the rollers 148, 150 traverse. In the example shown, two rollers 148 are provided and two rollers 150 are provided. Other numbers of rollers may be provided. In the example shown, the rollers 148, 150 are provided with an outer surface having a relatively harder material than that provided with roller 130, such as a metal material, for example stainless steel. Notably, the rollers 148, 150 of the roller assembly 106 are non-driven and roll due to contact with the turf. In configurations where all of the rollers 130, 148, 150 are powered by the power plant, each of the rollers would be preferably provided with a relatively hard exterior surface, such as a stainless-steel metal surface.

Referring to FIGS. 12 and 13, a second example turf roller 100' is presented. The turf roller 100' shares many overlapping features with the turf roller 100 of FIGS. 1 to 11. Accordingly, the above-provided description is applicable for such shared features and need not be repeated here. Rather, the description for 100' will be limited to the differences between the turf roller 100' and turf roller 100. The primary differences with turf roller 100' is that roller assembly 106' is provided with rollers 148' and 150' that are configured similarly to roller 130 and that the rollers 148' and 150' are powered for rotation via drive assemblies 158', 160' and respective actuators 204' and 206'. As mentioned previously, for configurations where multiple rollers are driven, it is preferable that the outer surfaces of each roller be formed from a relatively hard material, such as metal material. For example, each of the rollers 130', 148', and 150' of the turf roller 100' can be configured with stainless steel outer surfaces. In the example shown, the rollers 148' and 150' articulate and follow the turf surface, and are connected to the actuator 200' via a linkage 201' such that the actuator 200' steers all three rollers 130', 148', 150' simultaneously. The turf roller 100' can also be configured with powered steering for each of the rollers 148', 150' such that three actuators 200' operate independently to steer the three rollers 130', 148', 150', as coordinated by a controller 500.

Referring to FIGS. 14 to 17, a third example turf roller 100" is presented. The turf roller 100" shares many overlapping features with the turf roller 100 of FIGS. 1 to 11. Accordingly, the above-provided description is applicable for such shared features and need not be repeated here. Rather, the description for 100" will be limited to the differences between the turf roller 100" and turf roller 100. The primary difference with turf roller 100" is that that mechanical steering is provided rather than using a powered actuator 200, as with turf roller 100. As most easily viewed at FIG. 17, the turf roller 100" is provided with a lever assembly 170" operably mounted to the chassis 102". In one aspect, the lever assembly 170" includes a lever arm 172" connected to a first joint structure 174" and a second joint structure 176" that allows the lever arm 172" to be moved by the operator in forward and reverse directions (e.g., generally along the axis X) and left and right (e.g., generally along the axis Y) and positions therebetween. The lever arm 172" is further connected to a linkage mechanism such 178" such that movement of the lever arm 172" in the direction of the Y axis causes the roller 130" to be steered. The lever assembly 170" is also shown as being provided with a strut assembly 180" for stabilizing the lever arm 172". The lever arm assembly 170" is further shown as including control components in the form of an actuating lever 210" and a position sensor 212" that senses the lateral rotational position of the lever arm 172". As is described later, these components provide inputs to the control system for controlling the direction and speed of the roller 130" via actuator 202". As such, the turf roller 100" represents a hybrid control concept in which the same lever arm assembly 170" is used to mechanically control steering while electrically controlling the drive functions of the turf roller 100". This configuration and concept can also be applied to the turf roller 100' shown at FIGS. 12 and 13.

Referring to FIG. 18, the control components of the above-described examples are shown in further detail. In one aspect, an electronic controller 500 is provided for effectuating operation of the turf roller 100, 100', 100". In one aspect, the controller 500 includes a processor 500A and a non-transient storage medium or memory 500B, such as RAM, a flash drive, or a hard drive. Memory 500B is for storing executable code, the operating parameters, and the input from an operator user interface 502, while processor 500A is for executing the code. Memory 500B can also be for storing reference information such as maps and/or lookup tables. The electronic controller is also shown as including a transmitting/receiving port 500C, such as an Ethernet port for two-way communication with a WAN/LAN related to an automation system. The user interface 502 may be provided, for example at a control panel to activate and deactivate the system, allow a user to manipulate certain settings or inputs to the controller 500, and to view information about the system operation. The electronic controller 500 typically includes at least some form of memory 500B. Examples of memory 500B include computer readable media. Computer readable media includes any available media that can be accessed by the processor 500A. By way of example, computer readable media can include computer readable storage media and computer readable communication media. Computer readable storage media includes volatile and nonvolatile, removable and non-removable media implemented in any device configured to store information such as computer readable instructions, data structures, program modules, or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the processor 500A. Computer readable communication media typically embodies computer readable instructions, data structures, program modules, or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

With continued reference to FIG. 18, the electronic controller 500 is also shown as having a number of inputs/outputs that may be used for operating the turf roller 100, 100', 100" with the inputs and outputs in box A corresponding, wholly or partially, to turf roller 100, 100', and 100", the inputs and outputs in boxes A and B corresponding to the turf roller 100', and the inputs and outputs in box C corresponding to the turf roller 100". As stated previously, these components can be intermixed to achieve various functionalities. In an aspect, the controller 500 can send commands to and receive feedback from a power plant electronic control unit (ECU) 504. In some examples, three controllers are provided, including an interface controller, a primary motor controller, and a secondary motor controller. With regard to turf roller 100, the controller receives input signals from the joystick assembly 201 and the position sensor 203 and provides corresponding outputs to the first and second actuators 200, 202. The turf roller 100' includes the inputs and outputs from boxes A and B, namely inputs from joystick assembly 201' and position sensor 203' along with outputs to actuators 200', 202', 204', and 206'. The turf roller 100" includes an input from the actuating lever 210", position sensor 212", and provides a corresponding output to the actuator 202".

In one aspect, each of the turf rollers 100, 100', 100" advantageously enables a user to have both directional and speed control of the machine with motion of a single input member in the desired direction of travel with a single hand, without requiring the use of either of the operator's feet or two hands. With respect to turf rollers 100, 100', a two-axis lever 201a/201a' of the joystick assembly 201/201' can be simply pushed or pulled in the direction of desired travel to move the turf roller 201/201' in that direction. Further, the extent or degree to which the joystick assembly 201/201' provides an input to control the speed of the turf roller 100/100'. In one example, the joystick assembly 201/201' is configured as a two-axis joystick with two independent potentiometers that sense an angle of the lever 201a/201a' along each axis. In some examples, the joystick assembly 201/201' uses two hall-effect type magnetic sensors to determine and transmit the position of the joystick lever. The joystick assembly 201/201' can be configured with electronics to report a single overall position of the lever 201a/201a' to the controller 500 or can independently report the position signals of the potentiometers directly to the controller 500.

With such a configuration, the operator can, for example, displace the lever 201a/201a' in any direction and the controller 500 will operate the actuator 200/200' to steer the turf roller 100/100' in that direction while sending a command to drive the actuators 202/202', 204', 206' in the appropriate direction (e.g., forward or reverse). In one aspect, displacement of the lever 201a/201a' in any direction can be characterized as having a lateral position component along the axis Y and a longitudinal position component along the axis X, wherein the longitudinal position component is used by the controller 500 to command the direction and speed of the actuator(s) 202/202', 204', 206' and the lateral position component is used by the controller 500 to command the position of the actuator 200/200'. In one aspect, where the joystick lever 201a/201a' longitudinal position component is in a maximum position (fully to the left or right as viewed by the seated operator), the actuators 202/202', 204', 206' can be commanded by the controller 500 to their maximum allowable speed in that direction. Where the joystick lever 201a/201a' is longitudinally displaced at points between center and full range, the actuators 202 or 202', 204', 206' can be commanded by the controller to a speed that is proportional to the position of the lever 201a, 201a' with respect to a maximum position. In some examples, a joystick or input lever can be provided that uses a twisting motion for the steering control of the actuator 200/200' instead of moving laterally.

Although the turf roller 100" utilizes mechanical steering, the turf roller 100" still provides an operator with single input control for steering and speed through the use of the lever arm assembly 170" as the position sensor 212" provides an input for control of the actuator 202". In this configuration, the control is the same for that described above for the longitudinal position component with the lateral component being handled mechanically. The actuating lever 210" may be utilized as a safety feature to prevent the actuator 202" from operating unless the lever 210" is grasped by the operator.

Where multiple powered rollers are provided, such as with turf roller 100' shown at FIGS. 12 and 13, the control system 500 can be configured to send different outputs to the actuators 202', 204', 206' to drive the respective rollers 130', 148', 150' at different rotational speeds under certain conditions. Such functionality is advantageous in ensuring that the rollers 130', 148', 150' do not damage the turf during turning operations by "scrubbing" the turf (i.e . . . the roller slipping against the turf surface), as would otherwise be a concern were all three rollers commanded to the same speed during such an operation. For example, during a turning operation in which the roller 150' is on the inside of the turn, the controller 500 can provide an output to the actuator 206' that results in the roller 150' being powered to a lower rotational speed in comparison to roller 130' driven by actuator 202'. Similarly, the controller 500 can provide an output to the actuator 204' that results in the roller 148' being powered to a higher rotational speed in comparison to roller 130' driven by actuator 202'. In one aspect, the centerlines of the rollers 148', 150' are equidistant from the centerline of the roller 130' which defines the travel path of the turf roller 100'. Accordingly, during a turn, the actuator 204' or 206' associated with the outside roller 148' or 150' can be provided with a speed command that is increased from the command for the actuator 204' and roller 130' by a speed adjustment value or multiplier while the inside roller 148' or 150' can be provided with a speed command that is reduced from the command for the actuator 204' and roller 130' by the same speed adjustment value or multiplier. In one aspect, the speed adjustment value or multiplier is a function of the steering angle of the roller 130', or more generically the center-most roller, such that the speed adjustment value or multiplier increases with the degree of turning. The steering angle can be ascertained by the control command to the actuator 200/200' from the controller 500, the position sensor 203/203', and/or the internal position sensor of the actuator 200/200'. For a turf roller 100" with mechanical steering of the type shown at FIGS. 14-17, but with three powered rollers of the type shown at FIGS. 12-13, an additional position sensor can be provided to detect the steering angle to achieve the above-described functionality. The speed adjustment value or multiplier can be calculated and/or retrieved from a lookup table in the controller. In some examples, the speed adjustment value or multiplier can be different for the inside roller versus for the outside roller. For example, such an approach may be useful in implementations where the centerlines of the rollers 148', 150' are not equidistant from the centerline of the roller 130'.

Referring to FIGS. 19-40, a fourth example turf roller 400 is presented. The turf roller 400 shares many overlapping features with the turf roller 100, 100' and 100" of FIGS. 1-17. Accordingly, the above-provided description is applicable for such shared features and need not be repeated here. Rather, the description for 400 may be limited to focus on the differences between the turf roller 400 and turf rollers 100, 100' and 100".

As depicted, the turf roller 400 has a length extending along a longitudinal axis X, a width extending along a lateral axis Y, and a height extending along a vertical axis Z, wherein the X, Y, and Z axes are orthogonal to each other, forming a three-dimensional coordinate system. Consequently, the turf roller 400 exhibits a top side 402, bottom side 404, right side 406, left side 408, front side 410, and rear side 412. In embodiments, the turf roller 400 can include a chassis 414 and a plurality of roller assemblies 416, 418, 420 (e.g., drum-type rollers having a resilient outer surface) configured to enable the turf roller 400 to smooth the surface of the turf or soil. Further, in some embodiments, the turf roller 400 can include a rotatable frame 422, a pair of wheels 424, and a towing hitch 426 to enable the turf roller 400 to transition to a towing position for ease in transport.

Accordingly, embodiments of the present disclosure enable the turf roller 400 to transition between an operating position in which the roller assemblies 416, 418, 420 are in ground engaging contact, and a towing position in which the roller assemblies 416, 418, 420 are suspended off the surface of the ground, with the weight of the turf roller 400 primarily resting on the wheels 424 and the towing hitch 426. Further, embodiments of the present disclosure enable two modes of operation in the operating position, including: (1) a self-powered roller configuration, in which the roller assemblies 416, 418, 420 are driven by a power plant 475; and (2) a towed roller configuration, in which the turf roller is towed behind a tow vehicle while the roller assemblies 416, 418, 420 remaining ground engage in contact. The configurable nature of the turf roller 400, with its ability to transition between different positions and offer multiple modes of operation, enhances its functionality, versatility, and efficiency. These benefits contribute to improved ground preparation, ease of transportation, and the flexibility to adapt to various operational requirements.

In certain embodiments, the power plant 475 integrated into the turf roller 400 incorporates a rechargeable battery station, housing one or more batteries (as best depicted in FIG. 40). This battery station serves as a reliable power source for the roller assemblies 416, 418, and 420, which can be driven by individual motors such as drive motors 466, 468, 470, and so on. Additionally, the power plant 475 supplies power to the control system of the turf roller 400. This includes the input control station 480, which enables operators to manage and adjust various settings, and the actuator 452 and 460 controls, which facilitate the precise control and movement of components. One notable advantage of this configuration is the potential for a fully electric turf roller. By relying entirely on one or more batteries for power, the turf roller 400 can operate without the need for fossil fuels or external power sources. This presents several benefits, including reduced emissions, quieter operation, and increased environmental friendliness. The use of rechargeable batteries further enhances the turf roller 400 from a sustainability aspect, as the batteries can be recharged between uses, reducing waste and promoting energy efficiency.

As depicted in FIGS. 25 and 28, the turf roller 400 is operably connected to a towbar 428, which enables the rotatable frame 422 to rotate the pair of wheels 424, bringing the wheels 424 into contact with the ground, while the roller assemblies 416, 418, and 420 remain above the ground, not engaging with the surface. This configuration allows the turf roller 400 to be effectively towed behind a vehicle, serving various purposes such as transportation to and from different worksites. The specific arrangement illustrated in FIGS. 25 and 28 can be referred to as the towing position or towing configuration. In this position, the turf roller is securely hitched to the tow vehicle, utilizing the towbar 428 and the towing hitch of the vehicle.

FIGS. 26 and 29 depict the turf roller 400 in the towed roller configuration. In this configuration, the rotatable frame 422 is rotated to raise the pair of wheels 424 off the ground. As a result, the weight of the turf roller 400 is effectively transferred to the roller assemblies 416, 418, and 420 with the towbar 428 connected to the towing hitch 426. This configuration enables the turf roller 400 to be connected to the tow hitch of a vehicle, with the roller assemblies 416, 418, and 420 in ground engaging contact. This configuration offers particular utility when clearing the roller assemblies 416, 418, and 420 of debris, as connection to the tow hitch of the vehicle can serve to anchor the turf roller 400 in a fixed position while one or more of the roller assemblies 416, 418, and 420 are rotated to wipe debris collected on the one or more roller assemblies 416, 418, and 420 onto the ground.

FIGS. 27 and 30 depict the turf roller 400 in the self-powered roller configuration. In this configuration, the towbar 428 can be selectively detached from the towing hitch 426 while keeping the pair of wheels 424 suspended off the ground. Meanwhile, the roller assemblies 416, 418, and 420 maintain ground engaging contact. This position or configuration enables the turf roller to operate under its own power, independently engaging in operational use. Accordingly, by removing the towbar 428, the turf roller 400 becomes a self-contained unit capable of maneuvering and operating under its own power, thereby enabling the turf roller 400 to navigate diverse terrain and access areas where towing may not be practical.

With additional reference to FIG. 31, the towbar 428 can be configured to selectively couple and decouple to the turf roller 400 via the towing hitch 426. The towbar 428 can include a tongue portion 430, including a first hitch mount 432 connectable to the hitch of the tow vehicle and a second hitch mount 434 connectable to the towing hitch 426 of the turf roller 400. In some embodiments, the towbar 428 can further define a handle 436 generally extending outwardly away from the tongue portion 430 to aid in manipulation of the towbar 428 and to enable release of the towbar 428 from the towing hitch 426 while transitioning between configurations.

The towing hitch 426 can define a hitch mount receptacle 440 configured to receive the second hitch mount 434 of the towbar 428. To aid in guiding the second hitch mount 434 into engaging receipt with the towing hitch 426, and continued securement thereto, in some embodiments, the second hitch mount 434 can include a guide pin 438. In some embodiments, the hitch mount receptacle 440 can define one or more channels 442 configured to receive the guide pin 438 of the hitch mount 434.

Further, in some embodiments, the towing hitch 426 can include a grip surface 444 to which a latch grip 446 defined by the towbar 428 can selectively grip, thereby inhibiting separation of the towbar 428 from the towing hitch 426 in some configurations. For example, in some embodiments, the towbar 428 may only be separated from the towing hitch 426 when the turf roller 400 is in the operating position and the wheels 424 are raised off the ground. For example, release of the latch grip 446 from the grip surface 444, which in some embodiments can be controlled with the handle 436, may be inhibited while the turf roller 400 is in the towing configuration.

As best depicted in FIGS. 32 and 33, the towbar 428 and wheels 424 are configured to pivot relative to the chassis 414 of the turf roller 400. For example, the towbar 428 and wheels 424 can be pivoted relative to the chassis 414 between the towing configuration (as depicted in FIG. 32), in which the wheels 424 are pivoted into ground engaging contact in a manner that raises the chassis 414 away from the ground. At the same time, the rotatable frame 422 pivots the tongue portion 430 of the towbar 428 to align it substantially parallel with the ground. Alternatively, the wheels 424 can be raised to the towed roller configuration (as depicted in FIG. 33), thereby lowering the chassis 414. Simultaneously, the rotatable frame 422 pivots the tongue portion 430 gradually upwards toward the first hitch mount 432, relative to the ground.

In some embodiments a linkage 448 can operably tie the towbar 428 to the rotatable frame 422, thereby coupling the hitch mount receptacle 440 to the wheels 424, such that movement of the wheels 424 relative to the chassis 414 causes a pivoting or rotation of the towbar 428 relative to the chassis 414. As best depicted in FIGS. 34 and 35, in some embodiments, the rotatable frame 422 can include a saddle bend or other mechanism (e.g., cam surface, lever arm, etc.) configured to effectuate a desired relative motion between the linkage 448 and the wheels 424. For example, in one embodiment, the rotatable frame 422 can include a pair of wheel extension arms 450 upon which the wheels 424 are mounted. Accordingly, rotation of the rotatable frame 422 relative to the chassis 414 causes the wheels 424 to transition between the towing configuration (as depicted in FIG. 34) and the towed roller configuration (as depicted in FIG. 35).

To aid in transition between the trailer configuration and the towed roller configuration, in some embodiments, the turf roller 400 can include an actuator 452 configured to effectuate a relative motion between the chassis 414 and the rotatable frame 422, such that activation of the actuator 452 can drive the wheels 424 and the towbar 428 from the trailer configuration to the towed roller configuration, and vice versa. For example, in some embodiments, the actuator 452 can be an electrically powered linear actuator provided with an internal position sensor to provide feedback useful in determining a position of the wheels 424 relative to the chassis 414.

With the wheels 424 in the raised configuration (e.g., operating position) and the roller assemblies 416, 418, and 420 in ground engaging contact, the towbar 428 can be removed from the towing hitch 426, thereby enabling the turf roller 400 to transition to the self-powered roller configuration. For example as depicted in FIGS. 36 and 37, in certain configurations, the towbar 428 can be locked to the towing hitch 426 by latch grip 446, which can be configured to selectively grip surface 444. In some embodiments, the latch grip 446 can be configured to pivot relative to pivot 447 between an engaged position in which the latch grip 446 engages the grip surface 444, and a release or receiving position, in which the latch grip 446 can be released from the grip surface 444 or latch grip 446 can be engaged with the grip surface 444. In some embodiments, the latch grip 446 can be biased to the engaged position, with a button 469 (e.g., cable actuator positioned on the handle 436) configured to transition the latch grip 446 between the engaged position and the release or receiving position.

To inhibit inadvertent separation of the towbar 428 from the towing hitch 426 (e.g., in the towing configuration), in some embodiments the towbar 428 can be configured to pivot relative to the chassis 414, such that a locking surface 445, which can remain in a fixed position relative to the chassis 414 can come into abutting contact with the latch grip 446, thereby inhibiting release of the latch grip 446 from the grip surface 444. In this manner, the turf roller 400 ensures that the towbar 428 will not inadvertently release while the roller assemblies 416, 418, 420 are suspended above the ground. Rather, in some embodiments, release of the towbar 428 from the towing hitch 426 is limited to occasions where the roller assemblies 416, 418, 420 and a portion of the towbar 428 are in ground engaging contact.

With additional reference to FIG. 38, steering of the turf roller 400 can be effectuated by both manipulation of the towing hitch 426 (e.g., via the towbar 428) or through actuation of user controls (e.g., joystick assembly 201, etc.). As best depicted in FIG. 39, in some embodiments, at least a first roller 416 and a second roller 418 can be operably coupled to a yoke 454, which in turn can be pivotably coupled to the chassis 414 via a pivot 456, which can generally enable the rollers 416, 418 to pivot relative to the chassis 414 to effectuate a turn of the turf roller 400. Additionally, in some embodiments, each of the first and second rollers 416, 418 can be pivotably coupled to the yoke 454 by roller mounts 457, 459 including pivots 458, 461 which can generally enable the rollers 416, 418 to remain in ground engaging contact when traversing over uneven terrain.

To effectuate steering, a control input from the control station 480 (e.g., joystick assembly 201, etc.) can be used to effectuate movement of actuator 460, which can be coupled between the chassis 414 and the yoke 454 to affect pivoting of the yoke 454 relative to the chassis 414 about pivot 456.

For example, in some embodiments, the turf roller 400 can include a seat 482 and an armrest 484, with the control station 480 supported by the armrest 484 (as best depicted in FIG. 40). In one embodiment, the control station 480 includes a joystick assembly for controlling direction and speed of the turf roller 400. The control station 420 can be in communication with a controller (e.g., controller 500, etc.), which can provide an output signal for control of the actuator 460. As depicted, the actuator 460 can be an electrically powered linear actuator, which can optionally include an internal position sensor to provide feedback regarding a position of the yoke 454 relative to the chassis 414.

One notable aspect of the turf roller 400 is the ability to provide a user with directional and speed control with "single-hand control." This can be achieved by motion of the input member in the desired direction of travel, using only one hand and without requiring the use of the operator's feet or both hands. For example, a two-axis lever of the joystick assembly can be pushed or pulled in the desired travel direction to move the turf roller 400 accordingly. Additionally, the joystick assembly enables the operator to control the speed of the turf roller 400 by adjusting the extent or degree of the input provided. With this control configuration, the operator has the flexibility to displace the joystick in any direction, and the controller 500 will interpret the input and operate the actuator 460 to steer the turf roller 400 accordingly.

Alternatively, to affect steering with the towbar 428, the actuator 460 can be in a neutral or disengaged position, thereby enabling an external force applied to the towing hitch 426, which can be fixedly coupled to the yoke 454, to affect pivoting of the yoke 454 relative to the chassis 414 about the pivot 456.

As best depicted in FIG. 38, to inhibit skidding or dragging of portions of the roller assemblies 416, 418, and 420 on the ground during turns, certain embodiments employ a steering linkage 462 designed to synchronize the movement of the first and second rollers 416, 418 with the movement of the third roller 420. In one embodiment, the third roller 420 is mounted on a third roller mount 464 that incorporates a pivot 465. This pivot allows the third roller mount 464 to be pivotably connected to the chassis 414 via a third roller pivot 467. The steering linkage 462 is pivotably linked between the yoke 454 and the third roller mount 464, enabling the pivoting of the yoke 454 relative to the chassis 414 to simultaneously initiate coordinated pivoting of the roller mount 464 relative to the chassis 414. The steering linkage 462 ensures that the roller assemblies 416, 418, and 420 work together harmoniously during turns, inhibiting uneven dragging or skidding. Accordingly, by connecting the yoke 454 to the third roller mount 464, any movement or pivoting of the yoke 454 influences the synchronized movement of the third roller mount 464, maintaining proper alignment and coordination between the roller assemblies.

In addition to steering functionality, in some embodiments, the controller 500 can facilitate independent control of the rotation of each roller assembly 416, 418, 420 to minimize slipping or skidding of the rollers over the ground surface, particularly when the turf roller 400 is executing turns or traversing uneven terrain. To achieve this, each roller assembly 416, 418, 420 can be equipped with an independent direct electric drive motor 466, 468, 470, each of which can be powered by the power plant 475. In some embodiments, the motors 466, 468, 470 are configured to rotate their respective roller assemblies 416, 418, 420 in relation to their corresponding roller mounts 457, 459, 464.

To further improve the rotational control of the roller assemblies 416, 418, 420, the controller 500 can determine the "correct" speed at which the outer rollers should rotate based on the steer angle. By analyzing the arc length of the steer angle, the controller 500 can calculate the appropriate speed required for the outer rollers to maintain traction and inhibit slipping or skidding during turns. The controller 500 can also dynamically adjust and control the speed of the outer rollers based on the calculated steer angle to ensure that the roller assemblies 416, 418, 420 rotate at the precise speed necessary to maintain stability and traction during different maneuvers across a variety of operational surfaces. The ability to fine-tune the rotational speed of the roller assemblies 416, 418, 420 enhances the turf roller's maneuverability, allowing the turf roller 400 to navigate turns smoothly while minimizing the risk of slippage or loss of control.

For example, the motors 466, 468, 470 can be capable of selectively rotating in both forward and reverse directions, with the ability to adjust and control the speed over a range of controllable speeds, thereby enabling precise rotational control of the roller assemblies 416, 418, and 420 through a range of maneuvers over a range of operational surfaces.

For improved packaging and arrangement of components within the turf roller 400, the motors 466, 468, 470 can be positioned partially within the inner diameter of their respective roller assemblies 416, 418, 420. Accordingly, in some embodiments, the roller assemblies 416, 418, 420 rotate around the motors 466, 468, 470, which can be firmly fixed to the roller mounts 457, 459, 464, thereby ensuring compactness and efficient utilization of space within the turf roller 400 while maintaining a robust connection between the motors 466, 468, 470 and the roller assemblies 416, 418, 420.

During operation, it is common for mud, grass, and other debris to occasionally adhere to the roller assemblies 416, 418, 420. To facilitate the separation of debris from the roller assemblies 416, 418, 420 and maintain their optimal performance, certain embodiments incorporate specific features into the roller mounts 457, 459, 464, as depicted in FIG. 40. These features can include a flanged surface 472 and one or more cutouts or orifices 474, strategically designed to provide users a more complete view of the roller assemblies 416, 418, 420, and to enable better access for cleaning (e.g., with pressurized water, etc.) to encourage the separation of debris from the roller assemblies 416, 418, 420.

In certain embodiments, the roller assemblies (e.g., roller assemblies 416, 418, 420) of the turf roller 400 can be operated in different configurations to effectively clean and dislodge debris. For instance, at least two roller assemblies (e.g., roller assemblies 416, 418, etc.) can be held in a fixed position while the remaining roller assembly (e.g., roller assemblies 420, etc.) is actively rotated. Alternatively, one roller assembly (e.g., roller assemblies 420, etc.) can be rotated in a particular direction while one or more other roller assemblies (e.g., roller assemblies 416, 418, etc.) are rotated in the opposite direction. These configurations enable the roller assemblies 416, 418, 420 to rotate either outwardly or inwardly while maintaining the general position of the turf roller relative to the ground, ensuring stability and minimal disturbance to the ground surface. In particular, the rotational movement of the roller assemblies 416, 418, 420 enables the outer radial surfaces of specific rollers to drag across the ground, effectively dislodging and separating debris.

To facilitate the cleaning process, the controller 500 can provide partial automation of the cleaning process. For example, upon selecting a cleaning feature (e.g., via the user controls), the controller 500 can command one or more roller assemblies 416, 418, 420 to perform a cleaning operation, which may involve rotating one or more roller assemblies for a predetermined length of time (e.g., 10 seconds, 20 seconds, etc.), or a specific number of revolutions. For example, when the user activates the cleaning feature through the user controls, the controller 500 can issue commands to any of the roller assemblies (416, 418, 420), either individually (with one roller assembly fixed in position) or combined (with rollers rotating in opposite directions), to complete one revolution. In other embodiments, the controller 500 can command the roller assemblies to rotate up to 1.5 or 2 revolutions, with various other degrees of revolution also contemplated.

Cleaning of the roller assemblies 416, 418, 420 can be performed in different configurations, depending on the specific embodiment. In some cases, the cleaning process is conducted with the rollers aboveground, suspended in the trailer configuration. This allows for convenient access to the rollers and efficient removal of any accumulated debris, ensuring optimal performance during subsequent operations. Alternatively, in other embodiments, the roller assemblies 416, 418, 420 can be cleaned with the rollers in ground engaging contact, meaning that the cleaning process takes place while the turf roller is either in the towed or self-powered roller configurations. Such an approach enables the cleaning action to be performed directly on the rollers as they interact with the ground, ensuring thorough removal of debris that may have become embedded or stuck during operation.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A turf roller comprising:

a chassis having one or more wheels operably coupled thereto, wherein the chassis is configurable between a towed configuration, when the one or more wheels are in a ground engaging position, and a roller configuration, when the one or more wheels are in a non-ground engaging position;

one or more roller assemblies operably coupled to the chassis;

a prime mover supported by the chassis and powering the one or more roller assemblies of the turf roller; and a removable towbar extending between a first end region and a second end region, wherein the first end region of the towbar is selectively connectable to and removable from the chassis and the second end region of the towbar is configured to be coupled to a vehicle hitch mount, wherein the towbar is configured to contact a ground surface and define an upright orientation, wherein the first end region of the towbar vertically aligns with a receiver of the chassis when in at least one of the roller and the towed configuration;

wherein the towbar defines the upright orientation when connected to the chassis, and wherein the towbar maintains the upright orientation when coupled to the vehicle hitch mount and is detached from the chassis.

2. The turf roller of claim 1, wherein the towbar further comprises a body portion and a ground engaging portion extending downward from the body portion, wherein the ground engaging portion is configured to contact the ground surface.

3. The turf roller of claim 2, wherein the towbar includes a first part of a lock arrangement and the chassis includes a second part of the lock arrangement, the lock arrangement being configured to inhibit separation of the towbar from the chassis, the first part of the lock arrangement being proximate the ground engaging portion.

4. The turf roller of claim 2, wherein the towbar further comprises a handle extending from the body portion of the towbar proximate the ground engaging portion and configured to be grasped by an operator.

5. The turf roller of claim 1, wherein the receiver defines an open channel extending to a guiding element, wherein the guiding element is configured to coincide with at least one protrusion of the towbar to assist in selectively connecting the towbar to the chassis.

6. The turf roller of claim 5, wherein the receiver flares laterally outward to define the guiding element.

7. The turf roller of claim 1, wherein at least one of the towbar or the chassis includes a lock arrangement configured to inhibit separation of the towbar from the chassis.

8. The turf roller of claim 1, wherein the towbar is connectable to the chassis by an operator positioned on an operator seat of the turf roller.

9. The turf roller of claim 1, wherein the towbar is selectively connectable to the chassis such that the towbar is connected to the chassis at only one location, wherein the only one location is aligned with a longitudinal axis defining a primary direction of travel of the turf roller when in the roller configuration.

10. The turf roller of claim 1, wherein the one or more roller assemblies comprises a first roller assembly and a second roller assembly, each extending along a substantially similar longitudinal axis, wherein the first end region of the towbar is selectively couplable to the chassis between the first and second roller assemblies.

11. The turf roller of claim 1, wherein the one or more wheels rotate relative to the chassis independently from the towbar coupling with the chassis.

12. The turf roller of claim 1, wherein the one or more roller assemblies are configured to roll about a rolling axis, wherein the towbar is configured to move linearly in a direction substantially perpendicular to the rolling axis to selectively couple to the chassis.

13. A turf roller comprising:

a chassis;

one or more roller assemblies operably coupled to the chassis;

one or more wheels operably coupled to the chassis;

a prime mover supported by the chassis and configured to power the one or more roller assemblies of the turf roller; and a towbar extending between a first end region and a second end region, wherein the first end region of the towbar is selectively receivable by and removable from a receiver of the chassis with a horizontal linear motion and the second end region of the towbar is configured to be coupled to a vehicle hitch mount;

wherein the receiver defines an open channel extending to a guiding element, wherein the guiding element is configured to coincide with at least one protrusion of the towbar to assist in selectively connecting the towbar to the chassis, wherein the receiver flares laterally outward to define the guiding element.

14. The turf roller of claim 13, wherein the towbar further comprises a body portion and a ground engaging portion extending downward from the body portion, wherein the ground engaging portion is configured to contact a ground surface, and wherein the ground engaging portion comprises a plate, wherein the plate comprises a first part configured to contact the ground surface and a second part extending from the first part and towards the first end region of the towbar.

15. The turf roller of claim 13, wherein the towbar is selectively connectable to the chassis at a central location through which a longitudinal axis of the chassis passes, the longitudinal axis defining a primary direction of travel of the turf roller when in the roller configuration.

16. The turf roller of claim 14, wherein the towbar further comprises at least one protrusion extending away from the body portion of the towbar and configured to contact a portion of the chassis when the towbar is connected to the chassis.

17. The turf roller of claim 14, further including a lock arrangement configured to inhibit separation of the towbar from the chassis.

18. The turf roller of claim 17, wherein the lock arrangement includes a first part associated with the towbar that is located proximate the ground engaging portion.

19. The turf roller of claim 13, wherein the towbar further comprises a handle extending from a body portion of the towbar and configured to be grasped by an operator.

20. The turf roller of claim 19, wherein the handle is located proximate a ground engaging portion of the towbar.

21. The turf roller of claim 13, wherein the towbar defines an upright orientation when connected to the chassis, and wherein the towbar maintains the upright orientation when coupled to the vehicle hitch mount and is detached from the chassis.

22. The turf roller of claim 13, wherein the towbar is connectable to the chassis by an operator positioned on an operator seat of the turf roller.

23. The turf roller of claim 13, wherein the one or more wheels are configured to transition along an arcuate path between a ground engaging position and a non-ground engaging position.

24. The turf roller of claim 13, wherein the towbar includes a single bar extending centrally between the first end region and the second end region, and wherein the towbar extends along a longitudinal axis of the chassis when connected to the chassis.

25. A method of trailering a turf roller, the method comprising:

moving the turf roller towards a towbar via one or more roller assemblies in ground-engaging contact, wherein the one or more roller assemblies are operably coupled to a chassis of the turf roller;

aligning a receiver of the turf roller with the towbar via operation of the one or more roller assemblies; and receiving the tow bar with the receiver via operation of the one or more roller assemblies by an operator positioned on an operator seat of the turf roller;

wherein the one or more roller assemblies of the turf roller is powered by at least one prime mover supported by a chassis of the turf roller.

26. The method of claim 25, further comprising:

inserting the towbar into the receiver of the turf roller until at least one protrusion of the towbar contacts a guiding element of the chassis that coincides with the at least one protrusion.

27. The method of claim 26, further comprising:

securing the towbar to the receiver after the towbar is received by the receiver to inhibit separation therebetween.

28. The method of claim 27, further comprising:

actuating one or more wheels operably coupled to the chassis of the turf roller from a non-ground engaging position to a ground engaging position after the step of securing the towbar to the receiver.

* * * * *